(12) United States Patent
Taylor

(10) Patent No.: US 11,634,190 B2
(45) Date of Patent: Apr. 25, 2023

(54) CARGO BICYCLE CONVERSION SYSTEM

(71) Applicant: Scott Taylor, Denver, CO (US)

(72) Inventor: Scott Taylor, Denver, CO (US)

( * ) Notice: Subject to any disclaimer, the term of this patent is extended or adjusted under 35 U.S.C. 154(b) by 296 days.

(21) Appl. No.: 16/630,086

(22) PCT Filed: Jul. 12, 2018

(86) PCT No.: PCT/US2018/041912
§ 371 (c)(1),
(2) Date: Jan. 10, 2020

(87) PCT Pub. No.: WO2019/014506
PCT Pub. Date: Jan. 17, 2019

(65) Prior Publication Data
US 2020/0216135 A1 Jul. 9, 2020

Related U.S. Application Data

(60) Provisional application No. 62/559,138, filed on Sep. 15, 2017, provisional application No. 62/531,724, filed on Jul. 12, 2017.

(51) Int. Cl.
*B62K 7/04* (2006.01)
*B62K 13/08* (2006.01)
(Continued)

(52) U.S. Cl.
CPC ............... *B62K 7/04* (2013.01); *B62K 13/08* (2013.01); *B62K 19/34* (2013.01); *B62K 21/18* (2013.01); *B62L 3/02* (2013.01); *B62M 6/55* (2013.01)

(58) Field of Classification Search
CPC .......... B62K 7/04; B62K 13/08; B62K 19/34; B62K 21/18
See application file for complete search history.

(56) References Cited

U.S. PATENT DOCUMENTS 8,684,387 B1 4/2014 Saiki
10,577,045 B2 * 3/2020 Walter ..................... B62K 5/08
(Continued)

FOREIGN PATENT DOCUMENTS

BR    102013012530 A2    7/2016
CA    2657836 A1    9/2010
(Continued)

OTHER PUBLICATIONS

"The Lift Cargo Bike"; Oct. 17, 2016 [retrieved on Feb. 12, 2021]. Retrieved from: https://www.kickstarter.com/projects/1616617044/the-lift-cargo-bike.
(Continued)

*Primary Examiner* — Kevin Hurley
*Assistant Examiner* — Michael R Stabley
(74) *Attorney, Agent, or Firm* — Bernard IP Law, LLC

(57) ABSTRACT

The present disclosure relates generally to bicycles, in particular, the present disclosure provides systems and devices for converting a standard bicycle into a cargo bicycle using various detachable components. The ability to convert a standard bicycle into a cargo bicycle and back again confers many advantages, including eliminating the need for a separate bicycle for transporting cargo and encouraging the use of bicycles as a mode of transportation.

26 Claims, 22 Drawing Sheets

(51) Int. Cl.
   *B62K 19/34*   (2006.01)
   *B62K 21/18*   (2006.01)
   *B62L 3/02*    (2006.01)
   *B62M 6/55*    (2010.01)

(56) References Cited

U.S. PATENT DOCUMENTS

| 2004/0145147 A1 | 7/2004 | Asbury et al. |
| 2009/0072520 A1 | 3/2009 | Ehrenreich et al. |
| 2014/0091551 A1 | 4/2014 | Walter |
| 2015/0048584 A1 | 2/2015 | Lin |
| 2018/0050755 A1 | 2/2018 | Walter |

FOREIGN PATENT DOCUMENTS

| DE | 102014110261 A1 | 1/2016 |
| EP | 3015352 A1 | 5/2016 |
| EP | 1690782 A1 | 8/2016 |
| FR | 3018765 A1 | 9/2015 |
| JP | S5163353 U | 5/1976 |

OTHER PUBLICATIONS

Coxworth, Ben. "Bike kit lets you go Dutch in 60 seconds"; Jul. 11, 2016 [retrieved on Feb. 12, 2021]. Retrieved from: https://newatlas.com/the lift cargo-bike kit/44284.

"Turn Your Bike into Cargo Bike"; Jul. 15, 2016 [retrieved on Feb. 12, 2021]. Retrieved from: https://www.youtube.com/watch?v=IncGTd7DLjl&ab channel=NancyMelear.

Build a 2-wheel Cargo Bike: by "carkat" on insturctable.com; Sep. 20, 2011 [retrieved on Dec. 13, 2019]. Retrieved from: http://www.intrustble.com/id/build-a-2-wheel-cargo-bike/.

* cited by examiner

CARGO BICYCLE CONVERSION SYSTEM

RELATED APPLICATIONS

This application claims the benefit of priority from U.S. Provisional Patent Application No. 62/531,724, filed on 12 Jul. 2017, and U.S. Provisional Patent Application No. 62/559,138, filed on 15 Sep. 2017, the disclosures of which are hereby incorporated by reference in their entirety.

FIELD OF THE INVENTION

The present disclosure relates generally to bicycles. In particular, the present disclosure provides systems and devices for converting a standard bicycle into a cargo bicycle using various detachable components.

BACKGROUND OF THE INVENTION

Although cargo bicycles are thought to have originated in Holland in the $19^{th}$ century, cargo bicycles have proliferated around the world, including the United States, and are known by many names, such as, "box bicycle," "bakfiet," "delibicycles," "butcher's bicycles," "cycle trucks" and "long john bicycles." A cargo bicycle is generally considered any bicycle designed to carry a load that is not earned by the cyclist. Cargo bicycles can be designed with various features to facilitate the transportation of this cargo. In some cases, cargo bicycles include features designed to accommodate heavier-duty front or rear racks, features designed to accommodate smaller front wheels to reduce the center of gravity, and features designed to provide a larger range of low gears to reduce the effort required to transport the cargo. In other cases, cargo bicycles can include a frame with built-in accessories, such as an electric motor or an additional front or rear wheel, to address the specific commercial or personal needs of the cyclist.

As the population of urban centers increases and the effects of global climate change become more apparent, there has been an emphasis on cleaner forms of commercial and personal transportation. The cargo bicycle is uniquely positioned to address these concerns. However, many cyclists are often deterred from purchasing a separate bicycle designed only to transport cargo, especially a bicycle that is larger and perhaps more cumbersome than their standard bicycle. Additionally, to maximize their usefulness, cyclists are often forced to customize their cargo bicycles to address their individual cargo needs and/or to suit their individual physical profiles. This process and/or the purchase of additional bicycles can be complicated, time consuming, and expensive. Therefore, the ability to convert a standard bicycle into a cargo bicycle and back again confers many advantages, including, for example, eliminating the need for a separate bicycle for transporting cargo and encouraging the use of bicycles as a mode of transportation.

SUMMARY OF THE INVENTION

These and other needs are addressed by the various aspects, embodiments, and configurations of the present disclosure.

Embodiments of the cargo bicycle conversion system of the present disclosure are comprised of a cargo conversion frame detachably connected to a subject bicycle, at least one frame coupling component detachably connecting the cargo conversion frame to a portion of the frame of the subject bicycle, and a steering adapter system functionally coupling a portion of the subject bicycle (e.g., a fork, handlebar, and the like, attached to the subject bicycle) to a portion of the cargo conversion frame (e.g., a fork attached to the cargo conversion frame), and a brake coupling component detachably connecting the cargo conversion brake caliper cable to the subject bicycle (e.g., a cable splitter). The cargo bicycle conversion system of the present disclosure facilitates the reversible conversion of the subject bicycle into a cargo bicycle.

In some embodiments, the at least one frame coupling component of a cargo bicycle conversion system comprises a bottom bracket adapter configured to be adjustable to fit and able to engage with multiple and/or varied sizes of bottom brackets of the subject bicycle frame at the bottom bracket shell.

In some embodiments, the at least one frame coupling component of a cargo bicycle conversion system comprises a nub mount assembly configured to accommodate engagement with myriad sizes and configurations of bicycles.

In some embodiments, the at least one frame coupling component of a cargo bicycle conversion system comprises a nub mount assembly configured to engage with multiple and/or varied mid-electric motors mounted to a subject bicycle frame.

In some embodiments, the at least one frame coupling component of a cargo bicycle conversion system comprises a nub mount assembly configured to engage with specific mid-electric motors having specific mount bolt patterns.

In some embodiments, the at least one frame coupling component of a cargo bicycle conversion system comprises a nub mount shell permanently affixed, semi-permanently affixed, or integrally combined with, e.g., extruded, welded, machined, cast, forged, or otherwise attached to the subject bicycle frame.

In some embodiments, the at least one frame coupling component of a cargo bicycle conversion system comprises a nub mount shell permanently affixed, semi-permanently affixed, or integrally combined with, e.g., extruded, welded, machined, cast, forged or otherwise attached to the electric motor mount of the subject bicycle frame.

In some embodiments, the at least one frame coupling component of a cargo bicycle conversion system comprises a fabricated component configured to couple the cargo conversion frame to a fabricated component on the subject bicycle or mid-electric motor mount, wherein fabrication comprises extruded, casted, machined, welded, forged or other methods of fabricating components.

In some embodiments, the steering adapter system of a cargo bicycle conversion system comprises a steering convertor and a steering linkage, wherein the steering convertor and the steering linkage are functionally coupled.

In some embodiments, the cargo bicycle conversion system further comprises a fork coupling component for detachably connecting the fork attached to the subject bicycle to the steering convertor.

In some embodiments the fork coupling component of a cargo bicycle conversion system comprises at least one of the following connecting mechanisms for detachably connecting the fork attached to the subject bicycle to the steering convertor: quick release skewers, thru axle skewers, straps, a solid axle with nuts, fork pinching mechanisms, and combination and variations thereof.

In some embodiments the steering convertor connection comprises an attachment point for the subject bicycles fork. This attachment is mechanically fastened to a tube that pierces the frame vertically through an aperture. The opposite end of the tube has one or more arms with connection point(s) to attach the steering linkage(s). The circular movement of the attachment point therefore matches the movement of the attached arm.

In some embodiments, the distal end of the steering linkage of the steering adapter system of a cargo bicycle conversion system is functionally coupled to the fork attached to the cargo conversion frame, wherein movement of the fork attached to the subject bicycle causes corresponding movement of the fork attached to the cargo conversion system through actuation of the steering convertor and the steering linkage.

In some embodiments, the distal end of the steering linkage of the steering adapter system of a cargo bicycle conversion system is functionally coupled to the fork attached to the cargo conversion frame by at least one of the following mechanisms: nuts, bolts, screws, fasteners, clamps, straps, pins, cotter pins, couplers, plastic clips or joints, lock-and-key mechanisms, thru axles, quick release skewers, pivot joints, a ball-and-socket joints, rotational discs, pins, springs, welding and combinations and variations thereof.

In some embodiments, the steering linkage of the steering adapter system of the cargo bicycle conversion system is configured to extend from the steering convertor to the fork of the cargo conversion frame along a path that is substantially adjacent to the cargo conversion frame.

In some embodiments, the steering linkage of the steering adapter system of the cargo bicycle conversion system is configured to have one or more steering linkages extending from the steering convertor.

In some embodiments, the steering linkage of the steering adapter system of the cargo bicycle conversion system is configured to allow for length adjustment of the linkage, the adjustability corresponding directly or indirectly to the adjustability of the frame length, thereby facilitating container size modification.

In some embodiments, the cargo bicycle conversion system further comprises at least one front wheel functionally coupled to the fork of the cargo conversion system.

In some embodiments, the cargo bicycle conversion system further comprises at least one cargo container, the at least one cargo container detachably coupled to the cargo conversion frame.

In some embodiments, the at least one cargo container is detachably coupled to the cargo conversion frame by at least one of the following mechanisms: nuts, bolts, screws, fasteners, clamps, straps, pins, cotter pins, couplers, plastic clips or joints, lock-and-key mechanisms, thru bolts, quick release skewers, pivot joints, ball-and-socket joints, rotational discs, springs, hook-and-loop mechanisms, buckles, ties, ropes, welding and combinations and variations thereof.

In some embodiments, the at least one cargo container is comprised of grass (bamboo), wood, plastic, metal, metal alloys, polymeric material, carbon fiber, or combinations or variations thereof.

In some embodiments, the cargo conversion frame is comprised of grass (bamboo), wood, plastic, metal, metal alloys, polymeric material, carbon fiber or combinations or variations thereof.

In some embodiments, the at least one frame coupling component detachably connects the cargo conversion frame to a portion of the frame of the subject bicycle by mechanism comprising at least one securable thru bolt.

In some embodiments, the cargo conversion frame comprises a substantially linear portion configured to extend a certain distance from an area below the bottom bracket of the subject bicycle to the fork on the cargo conversion frame to accommodate the at least one cargo container.

In some embodiments, the distal end of the cargo conversion frame is angled upwards to accommodate the fork on the cargo conversion frame.

Embodiments of the present invention also include a cargo bicycle conversion kit that comprises: a cargo conversion frame detachably connectable to a subject bicycle, at least one frame coupling component detachably connecting the cargo conversion frame to a portion of the frame of the subject bicycle, at least one brake coupling component detachably connecting the cargo conversion brake caliper to the brake lever of the subject bicycle, and a steering adapter system functionally coupleable on the proximal end to a fork on the subject bicycle and on the distal end to a fork on the cargo conversion frame. The cargo bicycle conversion kit of the present disclosure facilitates the reversible conversion of the subject bicycle into a cargo bicycle.

Embodiments of the present disclosure also include a cargo bicycle conversion kit that comprises: a cargo conversion frame detachably connectable to a subject bicycle, at least one brake coupling component detachably connecting the cargo conversions brake caliper to the brake lever of the subject bicycle, at least one frame coupling component detachably connecting the cargo conversion frame to a portion of the frame of the subject bicycle, a steering adapter system functionally capable of extending the steering mechanism from the handlebar of the subject bicycle to the cargo conversion frame. The cargo bicycle conversion kit of the present disclosure facilitates the reversible conversion of the subject bicycle into a cargo bicycle. These and other advantages will be apparent from the disclosure of the aspects, embodiments, and configurations contained herein.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below. Broadly, the present invention contemplates a system and components thereof for easily, quickly, and reversibly converting a standard bicycle into a cargo bicycle. When practiced as disclosed herein, the present invention provides a novel and effective system and kit, and is thus, useful as disclosed herein but is not intended to be limited to these uses.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

FIG. 1A depicts a side view of the installed and engaged cargo bicycle conversion system; FIG. 1B is an exploded, non-limiting view of components comprising an embodiment of the present invention; and FIG. 1C depicts the cargo bicycle conversion system installed and conversion frame unengaged with a subject bicycle.

FIG. 2A depicts a view of the steering mechanism adapted to a subject bicycle as part of the cargo bicycle conversion system of the present disclosure; FIG. 2B depicts a view of the proximal end of the steering linkage coupled to the steering convertor that is actuated by the fork of the subject of the bicycle; FIG. 2C depicts a view of distal end of the steering linkage that couples to and actuates the front fork of the cargo bicycle conversion system.

FIG. 3A depicts a perspective view of an installed and engaged cargo bicycle conversion system; FIG. 3B depicts a nonlimiting, exploded perspective side view of the cargo attachment nub mount assembly engaged with the nub mount shell of the bicycle frame comprising an embodiment of the frame coupling assembly; FIG. 3C depicts a front isolated view of the coupling component assembly comprising the nub mount shell and nub mount assembly; FIG. 3D depicts an isolated perspective view of a nub mount; FIG. 3E depicts an isolated perspective view of an embodiment of the receiving portion of the cargo frame, thru bolt, and nub mount assembly; FIG. 3F depicts an isolated side view of an embodiment of an engaged frame coupling assembly; FIG. 3G depicts an isolated and exploded view of an embodiment of engaged frame connection plate section of the frame coupling component; FIG. 3H depicts an isolated and exploded view of an embodiment of the nub mount receiver.

FIG. 4A depicts a view of the fork coupling component with the fork of a subject bicycle attached to the steering adapter system coupled to a steering converter; FIG. 4B depicts an exploded, nonlimiting view of components comprising an embodiment of the steering adapter system; FIG. 4C depicts an isolated view of an embodiment of a fork mount component of the steering adapter system according to an embodiment; FIG. 4D depicts an embodiment of a fork rake adjuster plate component of the steering adapter system according to an embodiment.

FIG. 5A depicts a perspective view of an embodiment of a brake cable split housing base having a first and second housing stop, and a fastening means containment bridge;

FIG. 5B depicts an isolated view of a cargo conversion frame brake caliper cable, a subject bicycle brake caliper cable, and a subject bicycle brake lever cable, each comprising a cable housing, housing end cap, and cable splitter; and FIG. 5C depicts an isolated view of a brake cable split housing system functionally engaged with a brake caliper and brake lever cable prior to final attachment prepared for functional engagement of a brake caliper cable and a subject bicycle brake lever cable.

FIG. 6A depicts a side view of an embodiment of a mid-electric motor mount frame having an integrated nub mount shell. FIG. 6B depicts a side view of an embodiment of mid-electric motor casing plate mounted nub mount shell; and FIG. 6C depicts a side view of an embodiment of a mid-electric motor casing plate mounted nub mount shell.

DETAILED DESCRIPTION OF THE INVENTION

Figure 1A:
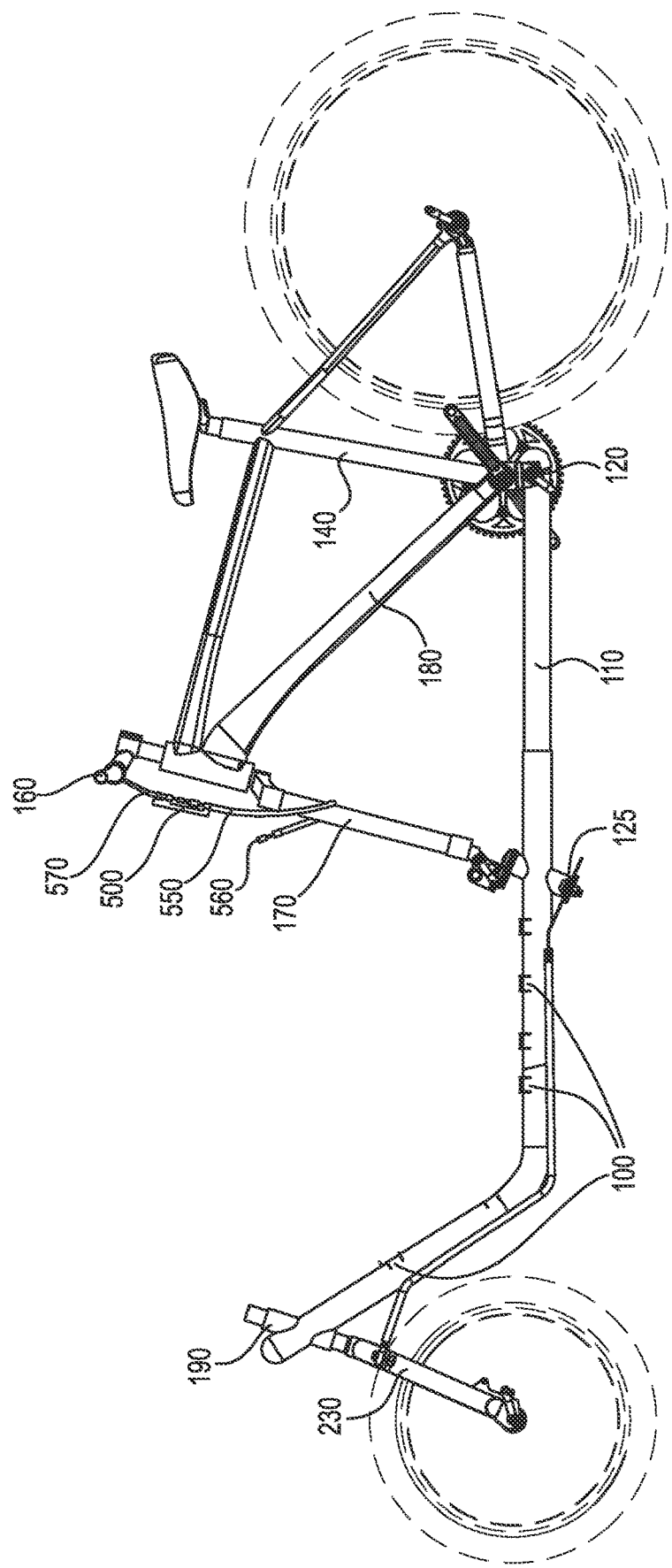
FIGS. 1A-C are representative isometric images of a subject bicycle equipped with a cargo conversion system, according to one embodiment of the present disclosure

The embodiments of the present invention described herein provide exemplary embodiments only, and are not intended to be exhaustive, limit the scope, applicability or configuration of the disclosure. Rather, the description of the exemplary embodiments provides those skilled m the art with an enabling description for implementing one or more of exemplary embodiments. It is understood by those skilled in the art that various changes may be made in the function and arrangement of elements without departing from the spirit and scope of the invention as set forth in the appended claims.

Unless specifically noted, it is intended that the words and phrases in the specification and the claims be given their plain ordinary and accustomed meaning to those of ordinary skill in the applicable arts. Accordingly, various implementations may be very broadly adopted and applicable.

The present disclosure relates generally to bicycles. Described herein, in particular, the present disclosure provides systems and devices for converting a subject bicycle into a cargo bicycle using various detachable components. The cargo bicycle conversion system of the present disclosure provides systems and methods for simply and conveniently coupling and uncoupling a cargo container and front fork and wheel of a cargo conversion system to a standard bicycle such that the operational integrity of the subject bicycle is maintained. In certain ways, the cargo bicycle conversion systems of the present disclosure obviate the need for a separate bicycle for transporting cargo.

Each of the components comprising the presently disclosed invention may be constructed, e.g., via welding, machining, casting, extruding, forging, 3D printing, or other fabrication methods now known or known in the future that would produce components with appropriate attributes, e.g., size, shape, strength, weight.

As used herein. "at least one", "one or more", and "and/or" are open-ended expressions that are both conjunctive and disjunctive in operation. For example, each of the expressions "at least one of A. B and C". "at least one of A, B. or C", "one or more of A, B, and C", "one or more of A. B, or C" and "A, B, and/or C" means A alone. B alone, C alone. A and B together. A and C together, B and C together, or A. B and C together. When each one of A, B. and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (for example, $X_1$ and $X_2$) as well as a combination of elements selected from two or more classes (for example, $Y_1$ and $Z_0$).

It is to be noted that the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "means" as used herein shall be given its broadest possible interpretation in accordance with 35 U.S.C. Section 112(f). Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

It should be understood that every maximum numerical limitation given throughout the present disclosure is deemed to include each and every lower numerical limitation as an alternative, as if such lower numerical limitations were expressly written herein. Every minimum numerical limitation given throughout the present disclosure is deemed to include each and every higher numerical limitation as an alternative, as if such higher numerical limitations were expressly written herein. Every numerical range given throughout the present disclosure is deemed to include each and every narrower numerical range that falls within such broader numerical range, as if such narrower numerical ranges were all expressly written herein Conversion System Broadly, the cargo bicycle conversion system of the present invention is comprised of a cargo conversion frame, at least one frame coupling component, a steering adapter system, and an optional brake split housing adapter. The system may be installed on and used with standard bicycles or mid-electric motor bicycles, hereinafter referred to as subject bicycles, having a non-suspended frame, or lockable suspension frame, and/or a non-suspended fork or lockable suspension fork, and facilitates the easy attachment of the bicycle to at least one standard or custom cargo container. As used herein, the term "cargo container" means container, box, seat, chair, rack, rickshaw, platform, basket, and the like, or any type of container designed to carry a load, including analogous and partially analogous terminology that the skilled artisan would understand as such. The cargo bicycle conversion system may accommodate a broad range of bicycle heights and frames styles, and may support a substantial amount of weight. The cargo bicycle conversion system is attached to the subject bicycle at, for example, two or more points, for example: 1) the subject bicycle frame; 2) the subject bicycle fork; and optionally, 3) the subject bicycle brake system Cargo Conversion Frame The cargo conversion frame of the present invention may be comprised of a solid or tubular component, e.g., chromoly tubing, each of which may be configured in any shape, such as, square, circular, triangular, and may be constructed of any material appropriate in size, weight, and strength for its intended use. The cargo conversion frame may be constructed of a single unitary piece, multiple sections detachably or permanently coupled together, or telescoping sections. The latter two constructions, facilitating the adjustability of the cargo conversion frame to fit with multiple sizes and styles of bicycle frames. For example, the cargo conversion frame of the present invention may comprise a front-, a middle-, and a rear-frame, detachably coupled in sequential order.

Frame Coupling Component

The frame coupling component for attaching the cargo conversion frame of the present invention to, for example, the bottom bracket area or mid-electric motor mount area of the frame of a subject bicycle may comprise: at least one plate, at least one fastener, e.g., threaded thru bolt, non-threaded thru bolt, screw, nut, pin, bolt, or the like, and variations and combinations thereof, and at least one nub mount, the frame coupling component configured to couple with a nub mount shell of a subject bicycle. The frame coupling component may further comprise one or more optional lock rings. Nub mount assembly frame coupling components may comprise: at least one frame connection plate having a female (receiving) threaded or non-threaded plate tube extending inwardly therefrom, at least one plate having a male threaded or non-threaded tube extending inwardly therefrom, at least one nub mount, and at least one threaded thru bolt. The nub mount assembly may further comprise one or more lock rings. The at least one plate, at least one thru bolt, and at least one nub mount couple via an attachment mechanism, e.g., nub mount shell and fastener, to the frame of the subject bicycle, and couple to the rear cargo conversion frame via a corresponding attachment mechanism, e.g., frame cap nub mount receiver. A nub mount shell is a mount bracket. It is integrally constructed with the bicycle frame, sits below the bottom bracket shell, and may be constructed of the same or different material than the bottom bracket shell. The nub mount shell diameter may range from 40 mm to 75 mm, preferably about 60 mm, and preferably less than the bottom bracket shell, i.e., 68 mm. The nub mount shell is configured to accommodate the components of the nub assembly. It may be configured in any number of shapes, e.g., circle, square, curve, mount, tube, or any other shape that provides an appropriate aperture for fastening of the frame connector plates, or the like. The frame coupling components may be secured after coupling, i.e., engagement, via a fastening means, such as a bolt, skewer, thru bolt, thru bolt pin, spring, or the like. In some embodiments, the at least one frame coupling component of a cargo bicycle conversion system may comprise a fabricated component configured to couple the cargo conversion frame to a fabricated component on the subject bicycle.

In some embodiments of the frame coupling component for attaching the cargo conversion frame of the present invention to, for example, a mid-electric motor mount area of the frame of a subject bicycle may comprise: at least one plate, at least one fastening means, the frame coupling component configured to couple with the motor mount of a subject bicycle, e.g. nub mount shell. The frame coupling component may further comprise an attachment mechanism, e.g., a nub mount, for coupling the subject bicycle to the rear cargo frame of the subject bicycle.

There is a multitude of configurations and embodiment by which the cargo bicycle conversion system of the present invention may be installed on a mid-electric motor bicycle using three basic approaches: 1) the frame coupling component or a portion thereof, e.g., nub mount shell, of the present invention the may be integrated into the motor mount or frame of the subject bicycle during manufacture 2) the frame coupling component or a portion thereof, e.g., nub mount shell, of the present invention may be integrated into the motor cover; and 3) the frame coupling component or a portion thereof, e.g., nub mount shell may be integrated into the motor casing. Each of the above embodiments may be manufactured, e.g., cast, during manufacture of the motor mount, motor cover, or motor casing without undue experimentation.

Steering Adapter System A steering adapter system comprising: a steering converter and adapter components, which may comprise standard equipment and/or concepts known in the art, or alternatively embody novel components, is rotatably mounted to the cargo conversion frame and functionally coupled to the fork of the subject bicycle on the proximal end of the steering adapter system, and rotatably and functionally coupled to the fork of the cargo conversion frame on the distal end of the steering adapter system. The steering adapter system is employed to maintain a 1:1 steering ratio when the cargo bicycle conversion system of the present invention is engaged, because cargo areas positioned between a rider and the front wheel of a bicycle distribute weight effectively but limit maneuverability of the bicycle. Additionally, long wheel bases may be slow to react to steering input, require exaggerated turning of handlebars, and reduce the turning radius of the bicycle. Therefore, maintaining a 1:1 steering ratio allows the rotation of the handle bars to be equivalent to the rotation of the cargo conversion frame wheel such that the bicycle steers the same with or without the cargo bicycle conversion system.

In some embodiments, the steering adapter system may comprise: one or more fork mounts, one or more fork rake adjuster plates, one or more steering arms, steering linkage, and one or more steering converter flanges, wherein a fork mount is adjustably coupled to a fork rake adjuster plate that is rotatably coupled to a steering arm having a steering converter flange, wherein the steering arm is functionally integrated with a head tube mounted through the cargo conversion frame, e.g., middle frame, using a headset as bearings, wherein the steering converter flange rotatably couples to the proximal end of the steering linkage, and wherein the distal end of the steering linkage is rotatably mounted to the cargo conversion fork, via e.g., a heim joint functionally coupled to a fork tab. In use, moving the subject bicycle handlebar will change the position of the fork mount coupled to the fork rake adjuster plate, which in turn is coupled to the steering arm. When the steering arm is rotated, the steering converter flange then pulls or pushes the proximal end of the steering linkage coupled to the conversion frame fork on its distal end producing a 1:1 steering ratio, provided that the distance from the center diameter point of the steering arm to the proximal steering linkage pivot point on the steering converter flange is equivalent to the distance from the center diameter of the conversion fork steer tube to the pivot point of the distal end of the steering linkage.

In some embodiments, the steering adapter system may comprise one or more adjustable steering linkages, wherein the proximal end of the linkage is adapted to and has a means to adjust in length corresponding to the adjustable length of the conversion frame, thereby accommodating a modified cargo container or containers.

Fork mounts known in the art and available commercially may be utilized in combination with the present invention. In a preferred embodiment, a non-standard, uniquely adapted fork mount comprising one or more differently sized fork mounts in a single component is adjustably and slidably coupled to a fork rake adjuster plate, in combination comprising a fork mount assembly. Alternative steering adapter systems and/or alternative steering systems may be utilized in the present Cargo Bicycle Conversion System. Alternative steering systems may include, e.g., direct steering, power steering, steering by leaning, or an independent turning cargo container wheel or wheels. In all or any of the steering adapter systems, steering linkage may comprise, for example, a rod, chain, belt, cable, or the like.

Brake Split Housing Adapter

Brake split adapters are know in the art. A brake splitter adapter comprising of, for example, two threaded tubes, male and female, a brake cable running from the subject bicycle brake lever runs inside of the brake housing. At a brake housing stop, the cable continues beyond the stop and is fastened to one part of the brake split adapter. The second part of the brake split adapter is threaded onto the first part. The second brake split adapter has a cable that extends beyond to insert into brake cable housing that is held in place by a brake cable housing stop.

The present brake split housing adapter disclosed herein is able to couple to the end of both the cargo conversion brake cable and/or the subject bicycle brake cable, such that the subject bicycle brake lever actuate whichever brake caliper, cargo conversion or subject bicycle, is connected to the brake split housing adapter. The brake split housing adapter may be employed to allow the brake cable from the brake lever of the subject bicycle to be connected to either the cargo conversion brake or to the installed brake on the subject bicycle. In an example of an embodiment of a brake split housing adapter that may be used in the present invention, the brake cable housing of the subject bicycle runs from the subject bicycle brake lever to a first housing stop of the brake split adapter. The subject bicycle's brake cable may run from the brake caliper to the opposite side and second housing stop of the brake split housing adapter. A third cable, i.e., cargo conversion brake cable, may run from the cargo conversion brake caliper to the second housing stop of the brake split housing. Either of the brake cables, i.e., cargo conversion or subject bicycle, may interchangeably be functionally coupled to the brake split adapter housing, and thus, the brake split adapter housing acts as a cable housing stop on both ends of the cable adapter housing. Additionally and/or optionally, an independent parking brake may be installed, or be part of the subject bicycle, to secure the resting bicycle, for example, when in use as a cargo bicycle.

Cargo Container

A cargo container may be removably, permanently, or semi-permanently attached to the cargo conversion frame prior to, concurrently with, or subsequent to engagement of the Cargo Bicycle Conversion System with the subject bicycle.

A cargo container may be fastened to the frame as a wholly constructed component at multiple attachment points on the front, middle, and/or rear frame of the conversion frame. Alternatively, a container base, or platform, may be mounted on the conversion frame and alternative container component embodiments may be attached thereto. Platform embodiments may be used in combination or as standalone components of the cargo container aspect of the invention. Cargo containers and/or container components may be constructed of, e.g., plastic, wood, metal, metal alloy, grass, carbon fiber, or any other suitable construction material. Cargo container components of the conversion frame system may further comprise, e.g., seating, strapping, handles, etc. A plethora of alternative construction embodiments and configurations of cargo containers is possible by the skilled artisan, some of which may be prefabricated and/or customized. Generally, a cargo container may be secured to the cargo bicycle conversion system via fastening means known in the art, e.g., alignment of apertures in the container base with correspondingly placed apertures or plates mounted on the cargo bicycle conversion frame, through which fastening means, e.g., carriage bolts and nuts, may be inserted and tightened.

In some embodiments, a front conversion frame may comprise a plurality of members configured to receive a cargo container having a plurality of corresponding conversion frame forks and/or wheels, to which a plurality of steering adapters may be functionally coupled.

All linkages and or connections described herein are intended to be easily implemented, i.e., easily connected and disconnected in a manner so that the subject bicycle rider may easily transition between bicycle and cargo bicycle. Once a conversion system of the current invention is installed on the subject bicycle, standard maintenance using standard tools is all that is required to maintain, or quickly attach/detach the cargo container section to the subject bicycle for conversion purposes.

Moving now to the figures, as illustrated in FIG. 1A, the cargo bicycle conversion system of the present disclosure includes a cargo conversion frame 110, at least one frame coupling component 120, and a steering adapter system 125. The cargo conversion frame 110 is connected to a subject bicycle 140 in a manner that facilitates the attachment, detachment, and reattachment to the subject bicycle 140 at various points and through various attachment mechanisms. For example, the subject bicycle 140 can be attached to the cargo conversion frame 110 at various points on the frame of the subject bicycle 140, including but not limited to, an installed, e.g., mechanically attached, piece of material or apparatus on the frame, a manufactured, e.g., fabricated as part of and in addition to standard frame, piece or apparatus of the subject bicycle frame, the bottom bracket, and/or to mounted mid-electric motors, of the subject bicycle frame. Additionally, to preserve the functionality of the subject bicycle 140, the front wheel of the subject bicycle 140 can be removed and stored, and the front fork of the subject bicycle 140 can be attached to the steering adapter system 125 of the cargo bicycle conversion system. In another example, the front fork of the subject bicycle 140 can be transferred to, and used as, a fork on the cargo bicycle conversion system. In another example, the front fork of the subject bicycle 140, including the front wheel, can be removed and stored, and the head tube of the subject bicycle 140 can be attached to a fork already attached to the steering adapter system 125 of the cargo bicycle conversion system. In another example, the steering adapter system 125, can include the functional extension and attachment of the steering mechanism of the subject bicycle 140 (e.g., handlebars 160) to the fork or wheel attached to the cargo conversion frame.

Additionally illustrated in FIG. 1A is that the cargo bicycle conversion system of the present disclosure may also include at least one cargo container 150. The cargo container 150 generally occupies a position between the fork 170 of the subject bicycle 140 and the fork 230 and wheel of the cargo bicycle conversion system (i.e., "front loaded" cargo bicycle). In this manner of attachment, the cargo conversion frame 110 of the cargo bicycle conversion system creates a triangle with the subject bicycle fork 170 and down tube 180 providing structural integrity and strength while expanding the area in which a cargo container 150 can be positioned. In some embodiments, the cargo conversion frame 110 comprises a substantially linear portion configured to extend a certain distance from an area below the mid-electric motor or the bottom bracket of the subject bicycle to the fork 230 on the cargo conversion frame 110 or head tube 190 to accommodate the cargo container 150. In some embodiments, the distal end, or front, of the cargo conversion frame 110 is angled upwards at an acceptable angle in order to accommodate the fork 230 and/or head tube 190 on the cargo conversion frame 110. In some embodiments, the cargo conversion frame 110 is comprised of a plurality of sections (see, FIG. 1B), e.g., a rear frame section 113, a middle frame section 112, and a front frame section 111, that may be sequentially and/or adjustably coupled. In some embodiments, the cargo conversion frame 110 may have a front frame section configured to have a plurality of frame spines, e.g., split into 2 or more front frame sections originating from the front frame section coupling end, to accommodate a plurality of cargo conversion frame forks, head tubes, and/or wheels.

A cargo container 150 can be detachably coupled to the cargo conversion frame 110, such that a user can easily attach, detach, and reattach the cargo container 150 to the cargo conversion frame 110, with or without the presence of cargo within the cargo conversion container 150. In some embodiments, the cargo conversion container 150 can be attached, detached, and reattached from the cargo conversion frame 110 in segments or pieces, rather than attaching, detaching, and reattaching the entire cargo conversion container 150 as whole. In some embodiments, the cargo conversion container 150 can be attached to the cargo conversion frame 110 in a manner that is not easily detachable or reattachable, e.g., permanent, semi-permanent, depending on the individual needs or wants of the user. Mechanisms by which a cargo container(s) 150 can be attached to a cargo conversion frame 110 of the cargo bicycle conversion system can include, but are not limited to, nuts, bolts, screws, fasteners, clamps, straps, pins, cotter pins, couplers, plastic clips or joints, lock-and-key mechanisms, thru bolts, quick release skewers, pivot joints, ball-and socket joints, rotational discs, springs, hook-and-loop mechanisms, buckles, ties, ropes, welding, and combinations and variations thereof, coupled directly to the cargo conversion frame or, e.g., one or more mount plates 100 (mounted on the cargo conversion frame (see, FIG. 1B). One or more, preferably a plurality, of mount plates 100 may be permanently, semi-permanently, or detachably mounted to the surface of the cargo conversion frame 110 for securing a cargo container 150 thereto. Alternatively and/or additionally, one or more mount plates may be fabricated as part of the cargo conversion frame.

The cargo conversion frame 110 and the cargo container 150 can be comprised of various materials, and in some cases, they can be comprised of the same materials or different materials. For example, the cargo conversion frame 110 and/or the cargo container 150 of the cargo bicycle conversion system of the present disclosure can be made from materials that include, but are not limited to, grass (bamboo), wood, paper, plastic, metal, metal alloys, polymeric material, carbon fiber, and combinations and variations thereof. Additionally, both the cargo conversion frame 110 and the cargo container 150 can be comprised of various materials having various shapes and sizes, as would be readily recognized by one of ordinary skill in the art based on the present disclosure.

Additionally illustrated m FIG. 1A is that the cargo bicycle conversion system of the present disclosure may also include a brake split housing adapter 500 useful for employing the brake lever cable 570 of the subject bicycle for actuation of the cargo conversion brake caliper cable 550 and/or the actuation of the subject bicycle brake caliper cable 560.

Figure 1B:
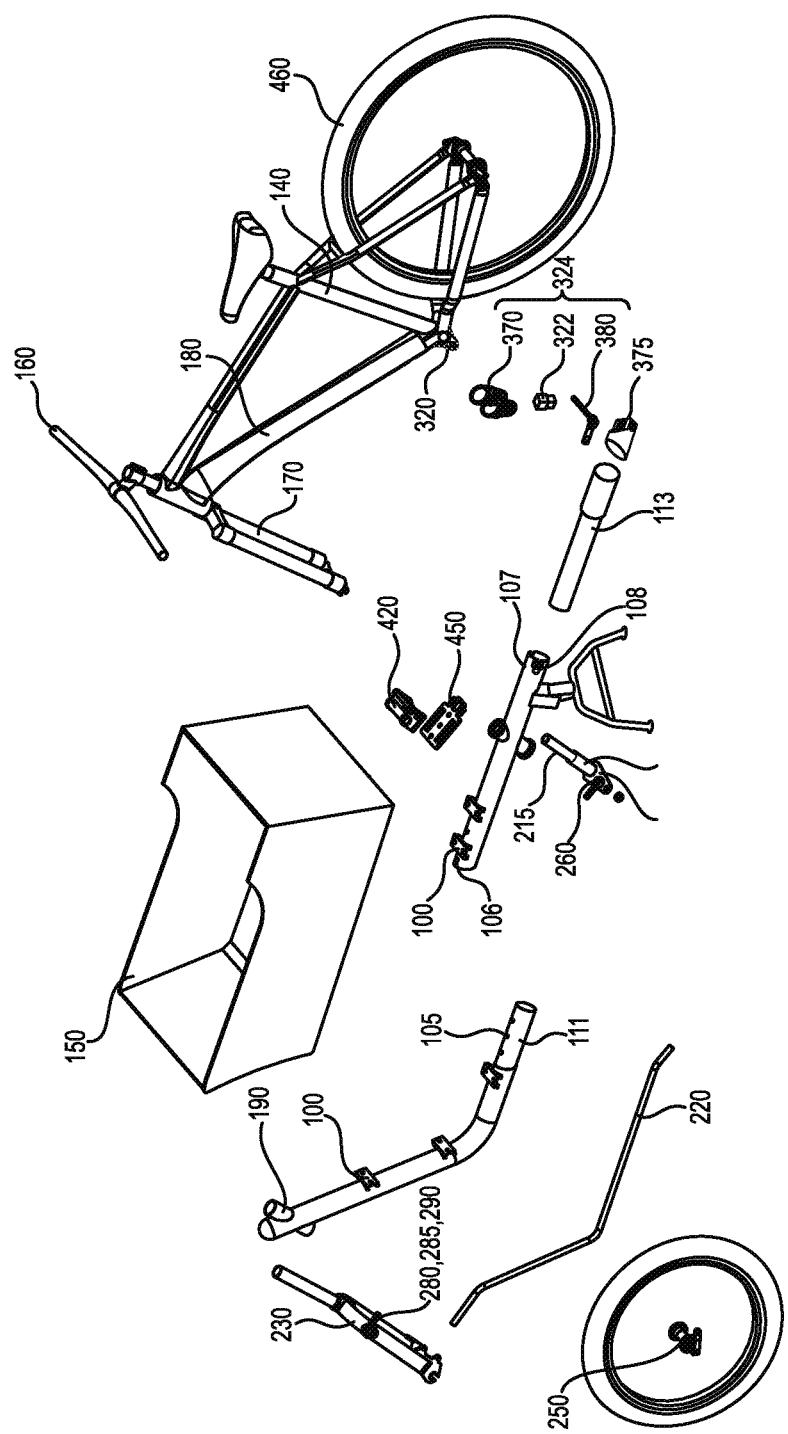

For illustrative purposes and clarity, FIG. 1B depicts an exploded view of individual components of an embodiment of the present invention and how they may relate to one another, but is not necessarily intended to be comprehensive or limiting. FIG. 1B is intended to be nonlimiting and exemplary for reference. Additionally illustrated in FIG. 1B is an alternative embodiment of the at least one frame coupling component 324 of a cargo bicycle conversion system comprising: at least one nub mount shell 320, a plurality of frame connection plates 350, 360; at least one nub mount 322; at least one thru bolt 380, and at least one rear conversion frame nub mount receiver 375.

The frame connection plates 350, 360 having adjuster tubes 352, 362 slidably couple inside of the upper aperture of the nub 335. The nub fasteners 353, 363, e.g., are be tightened to hold the plates in place. The subject bicycle frame 110 connects to the frame connection plates 350, 360 by way of one or more fasteners when the nub mount assembly is attached to the subject bicycle, or alternatively, fasteners, e.g., bolts, pins, thru bolts, screws, and the like, or variations or combinations thereof, are used to secure the nub mount assembly to the nub mount shell. In order to engage the nub mount assembly to the conversion frame, the nub mount 322 is inserted into the nub mount receiver cavity 378, the respective apertures 334, 376, 377 aligned, and a thru bolt 380 inserted therethrough and secured.

Figure 1C:
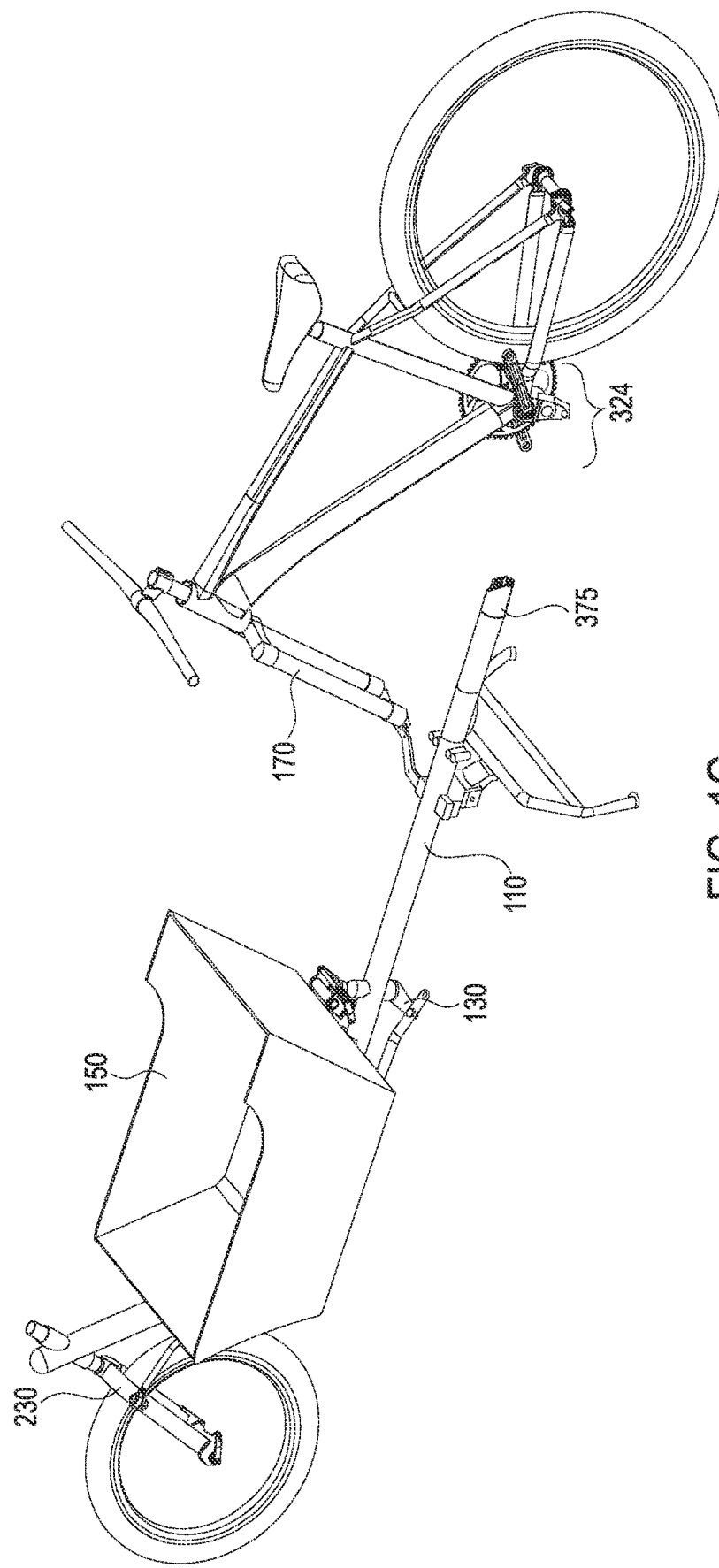

FIG. 1C depicts the assembled cargo conversion frame 110 and cargo container 150 portion of the cargo bicycle conversion system of the present invention disengaged from the subject bicycle 140 portion. The frame coupling component 324, i.e., nub mount assembly, comprised of at least one frame connection plate 350, 360, at least one nub mount 322, and at least one thru bolt 380, is installed on the subject bicycle, such that the assembled cargo conversion frame 110 and cargo container 150 portion of the conversion system with via engagement with a nub mount shell 320 and may be engaged with and detachably coupled to the subject bicycle 140 by engaging the nub mount assembly 324 and inserting and engaging a thru bolt 380 therethrough.

Figure 2A:
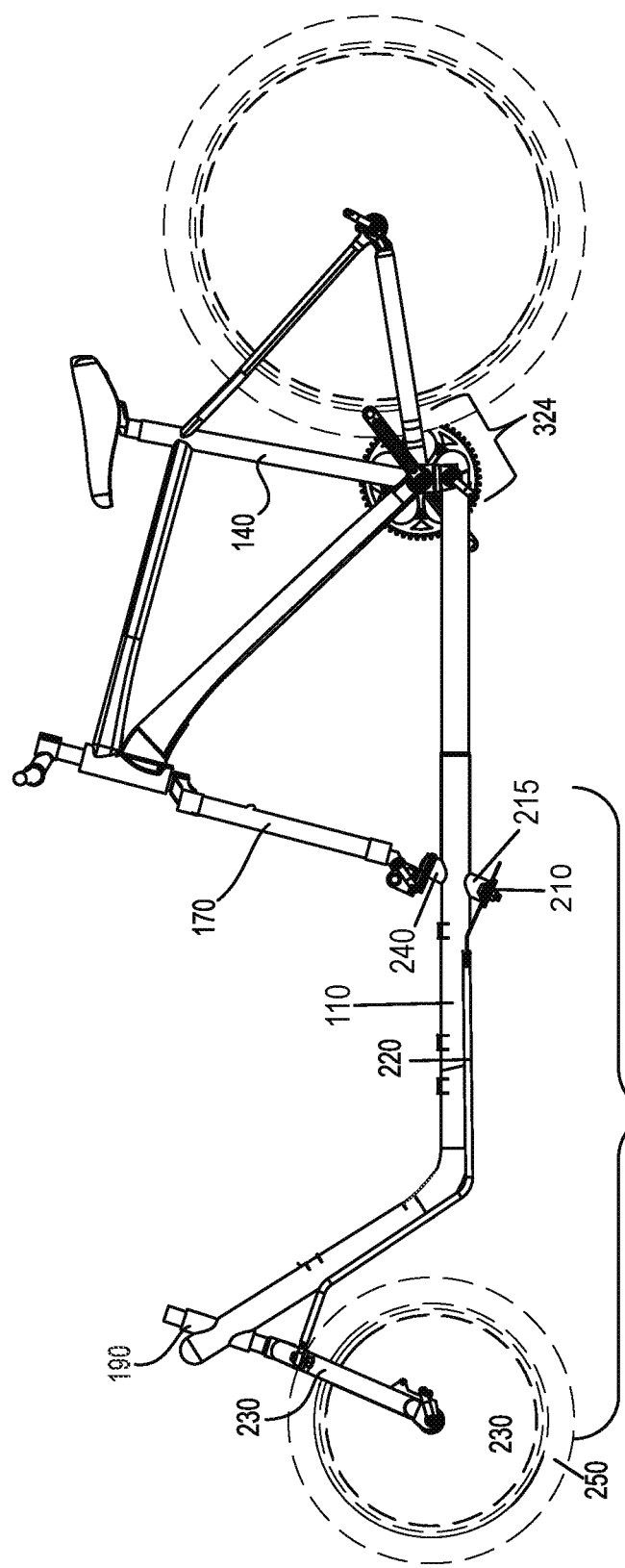
FIGS. 2A-2C are representative images of the frame of a cargo conversion system attached to a subject bicycle according to one embodiment of the present disclosure.
Figure 2B:
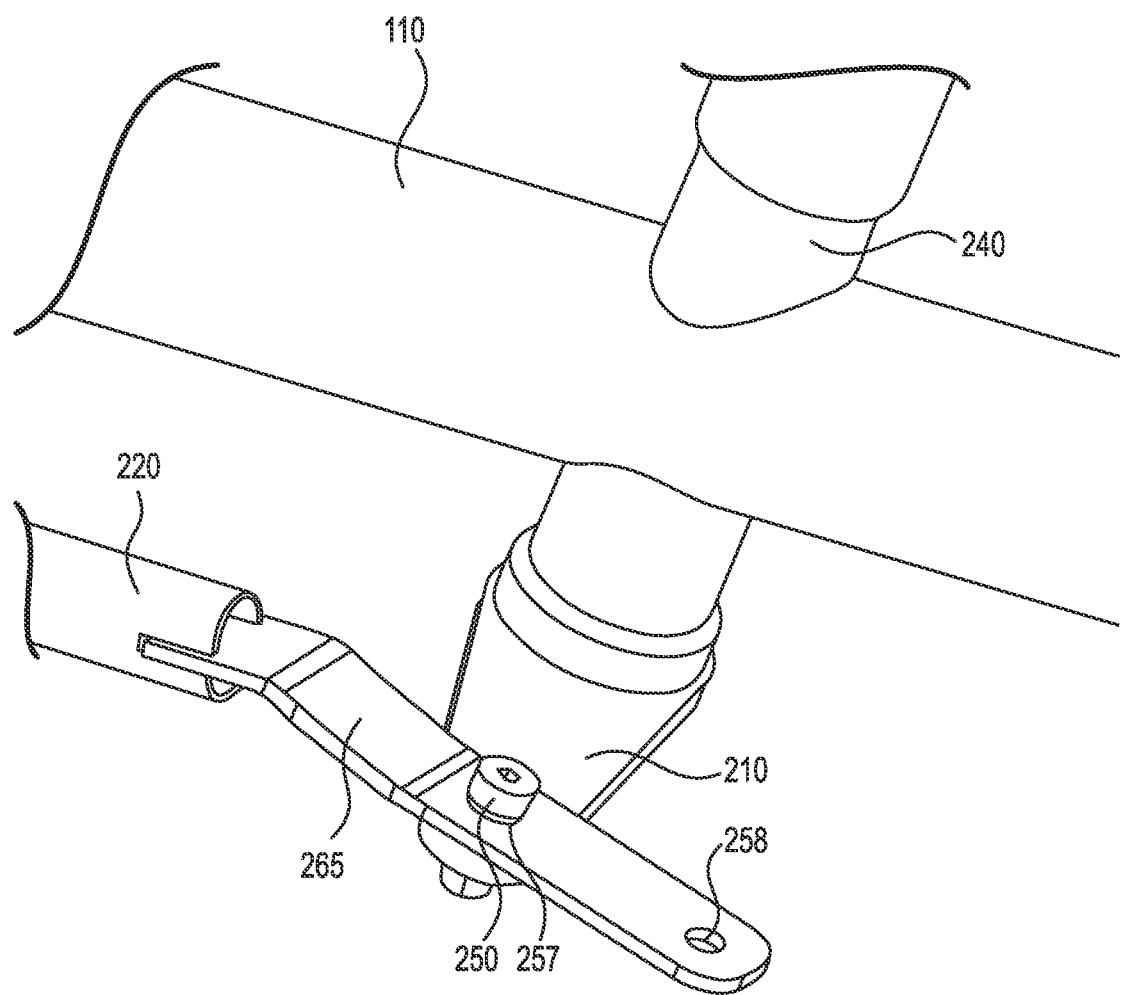
Figure 2C:
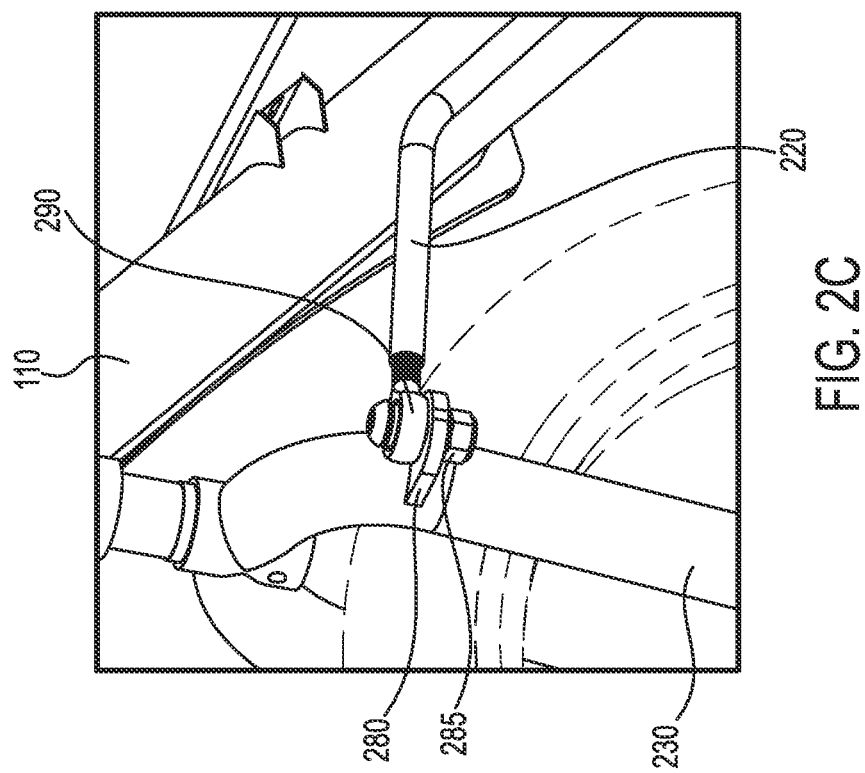
Figure 4A:
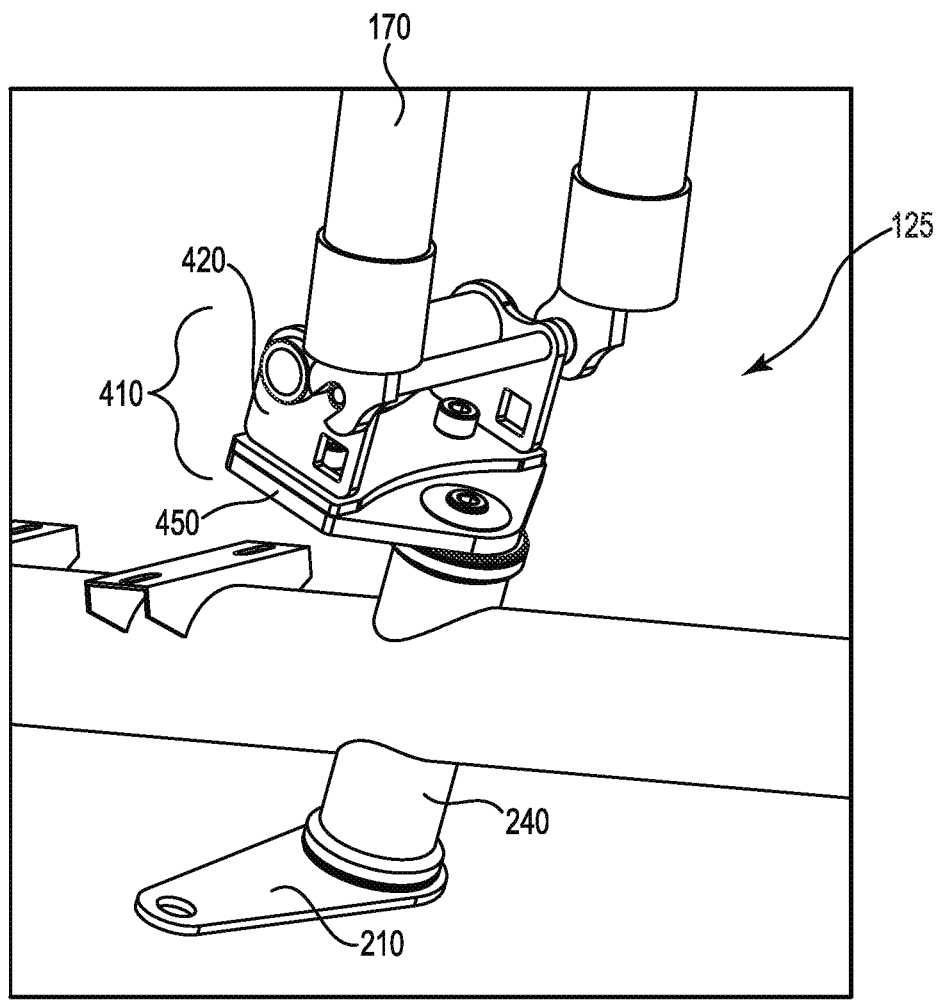
FIGS. 4A-4D are representative images of a steering adapter system, according to one embodiment of the present disclosure.

As further illustrated in FIGS. 2A-C, the cargo bicycle conversion system of the present disclosure further comprises a steering adapter system 125 comprising a steering assembly 130 and a fork coupling assembly 410 (see, FIG. 4A). As shown in FIG. 2A, the steering assembly 130 portion of the steering adapter system 125 of the present disclosure generally comprises a steering arm 215 with a distal end steering convertor flange 210 extending therefrom, and steering linkage 220. The steering adapter system 125 is designed to functionally couple the fork 170 attached to the subject bicycle 140 (see, e.g., FIG. 1) to the fork 230 attached to the cargo conversion frame 110 so that the rider of the subject bicycle 140 can effectively steer the subject bicycle 140 when it is coupled to the cargo bicycle conversion system, i.e., the operational integrity of the subject bicycle is maintained. The steering linkage 220 can be configured to extend from the steering convertor 210 (proximal end of linkage) to the fork 230 attached to the cargo conversion frame 110 (distal end of linkage) along a path that is substantially adjacent to the cargo conversion frame 110. This configuration can prevent the steering linkage 220 from interfering with the attachment and/or functionality of other components of the system, such as, the cargo container 150. The steering linkage 220 may be comprised of a single, unitary linkage component, or comprised of a plurality of coupled sections, e.g., a front or distal linkage section coupled to a rear or proximal linkage section.

FIG. 2B illustrates an exploded view of a steering arm 215 (not shown, see, FIG. 1B) inserted and rotatably mounted within a headtube 240 piercing the cargo conversion frame 110, the steering arm 215 having a steering converter flange 210 extending outward therefrom, the distal portion of the steering convertor flange 210 adapted for coupling, i.e., having an aperture intended for coupling purpose, and thus, may be functionally and rotatably be coupled to both the fork 170 attached to the subject bicycle 140, e.g., through fork coupling component(s) (see, e.g., FIGS. 4A-C), and the proximal end of the steering linkage 220. Because the steering convertor flange 210 is functionally and rotatably coupled to the steering linkage 220 and the handlebars 160 of the subject bicycle (through the fork 170 of the subject bicycle), the steering convertor flange 210 is able to convert a rider's actuation of the handlebars of the subject bicycle 140 into corresponding movement in the fork 230 attached to the cargo conversion frame 110, which in turn steers the converted cargo bicycle. The proximal end of the steering linkage 220 can be rotatably coupled to the steering convertor flange 210 through various mechanisms, including but not limited to, nuts, bolts, couplers, screws, fasteners, quick release skewers, thru axles, thru bolts, clamps, rivet, plastic clips or joints, lock-and-key mechanisms, pivot joints, a ball-and-socket joints, universal joints, bushings, rotational discs, straps, cotter pins, pins, springs, welding and combinations and variations thereof. In some embodiments, a nut 255 can be mounted, e.g., welded or threaded onto a screw, to the coupling aperture of steering converter flange 210, an eye bolt 260, e.g., heim joint or fastener, can be coupled, e.g., threaded, to the proximal end of the steering linkage 220, and the two can be connected such that the steering adapter system 125 is adjustable, e.g., in length via threading or unthreading of the eye bolt 260. In some embodiments, the proximal end of the steering linkage 220 is configured as a flat element 265 having at least one aperture 258 therethrough for rotatable coupling to the steering converter flange 210, the one or more apertures 258 therethrough useful for length adjustment of the assembly via engagement of alternative apertures 258. Such configuration minimizes shelf movement, e.g., side-to-side, and/or vertical movement, e.g., up-down, of the steering linkage 220, thereby stabilizing the assembly. The proximal end flat element 265 may be fabricated as part of the steering linkage 220, or alternatively, be a separate element attached to the proximal end of the steering linkage 220 via, e.g., welding, bonding, bolting, or the like.

Additionally, as illustrated in FIG. 2C, the distal end of the steering linkage 220 may couple to and actuate the fork 230 attached to the cargo conversion frame 110 when a rider moves the handlebars 160 of the subject bicycle 140. The distal end of the steering linkage 220 can be rotatably coupled to the fork 230 attached to the cargo conversion frame 110 through various mechanisms, including but not limited to, nuts, bolts, screws, couplers, fasteners, quick release skewers, thru axles, clamps, rivet, plastic clips or joints, lock-and-key mechanisms, pivot joints, a ball-and-socket joints, universal joints, bushings, rotational discs, pins, springs, and the like. In some embodiments, a tab 280 can be mounted, e.g., welded or fabricated thereon, to a portion of the fork 230, an eye bolt 290, e.g., heim joint, can be coupled, e.g., threaded, to the distal end of the steering linkage 220, and the tab 280 and steering linkage 220 can be connected, e.g., with a nut mechanism 285, welded or threaded, such that the steering adapter system 125 is adjustable, e.g., in length via threading or unthreading of the eye bolt 290.

In some embodiments, the proximal end flat element 265 of the steering linkage 220 may couple to the steering adapter system 125 via one or a plurality of apertures therethrough 258 (see, FIG. 2B) and be positioned for the provision of adjustability corresponding, either directly or indirectly, to the length adjustability of the cargo conversion frame. The proximal end flat element 265 of the steering linkage 220 can be rotatably coupled to the steering convertor flange 210 through various mechanisms, including but not limited to, nuts, bolts, couplers, screws, fasteners, quick release skewers, thru axles, thru bolts, clamps, rivet, plastic clips or joints, lock-and-key mechanisms, pivot joints, a ball-and-socket joints, universal joints, bushings, rotational discs, straps, cotter pins, pins, springs, welding and combinations and variations thereof. In some embodiments, a nut 255 can be mounted, e.g., welded or threaded onto a screw, to the coupling aperture of steering converter flange 210, an eye bolt 260, e.g., heim joint or fastener, can be coupled. e.g., threaded, to the proximal end flat element 265 of the steering linkage 220, and the two can be connected such that the steering adapter system 125 is adjustable, e.g., in length via threading or unthreading of the eye bolt 260. In some embodiments, the proximal end flat element 265 of the steering linkage 220 is configured as a flat element having at least one aperture therethrough for rotatable mounting. Such configuration minimizes shelf movement, e.g., side-to-side and/or up-down, thereby stabilizing the assembly.

As illustrated in FIGS. 3A-3H, the cargo bicycle conversion system of the present disclosure includes various coupling components for attaching, detaching, and reattaching the cargo bicycle conversion system of the present disclosure to a subject bicycle. As shown m FIG. 3A, in some embodiments, one manner of attachment of the cargo bicycle conversion system of the present disclosure includes at least one frame coupling component, a nub mount assembly 324, comprised of at least one nub mount shell 320 or bottom bracket shell 355, at least one nub mount 322, at least one frame connection plate, at least one thru bolt 380, and may further comprise at least one nub mount receiver 375.

In some embodiments, the subject bicycle frame 110 is constructed with a bottom bracket shell 355 and an integrated and additional shell, nub mount shell 320, positioned directly below the bottom bracket shell, e.g., at or near the lowest point of the subject bicycle frame 110. The frame coupling component comprised of a nub mount assembly 324 may be coupled to the cargo conversion frame by engaging with the nub mount shell 320 (see, FIG. 3A) or the bottom bracket shell 355. For ease of understanding, the exemplary embodiments may focus on the nub mount shell, but it should be understood that the nub mount assembly may be effectively engaged with either the nub mount shell or the bottom bracket shell. The nub mount shell 320 can be manufactured as part of the subject bicycle frame 110, or alternatively, welded, cast, extruded or otherwise fabricated and attached to the subject frame 110. The frame connection plates 350, 360 are coupled to the frame by aligning their upper apertures 356 on either side of the nub mount shell 320, and inserting and securing one or more fasteners therethrough. The nub mount 322 is then coupled to the frame connection plates 350, 360 by engaging the plate tubes 352, 362, through the nub mount upper aperture 335 and securing the nub mount 322 there between with the one or more fasteners.

Figure 3A:
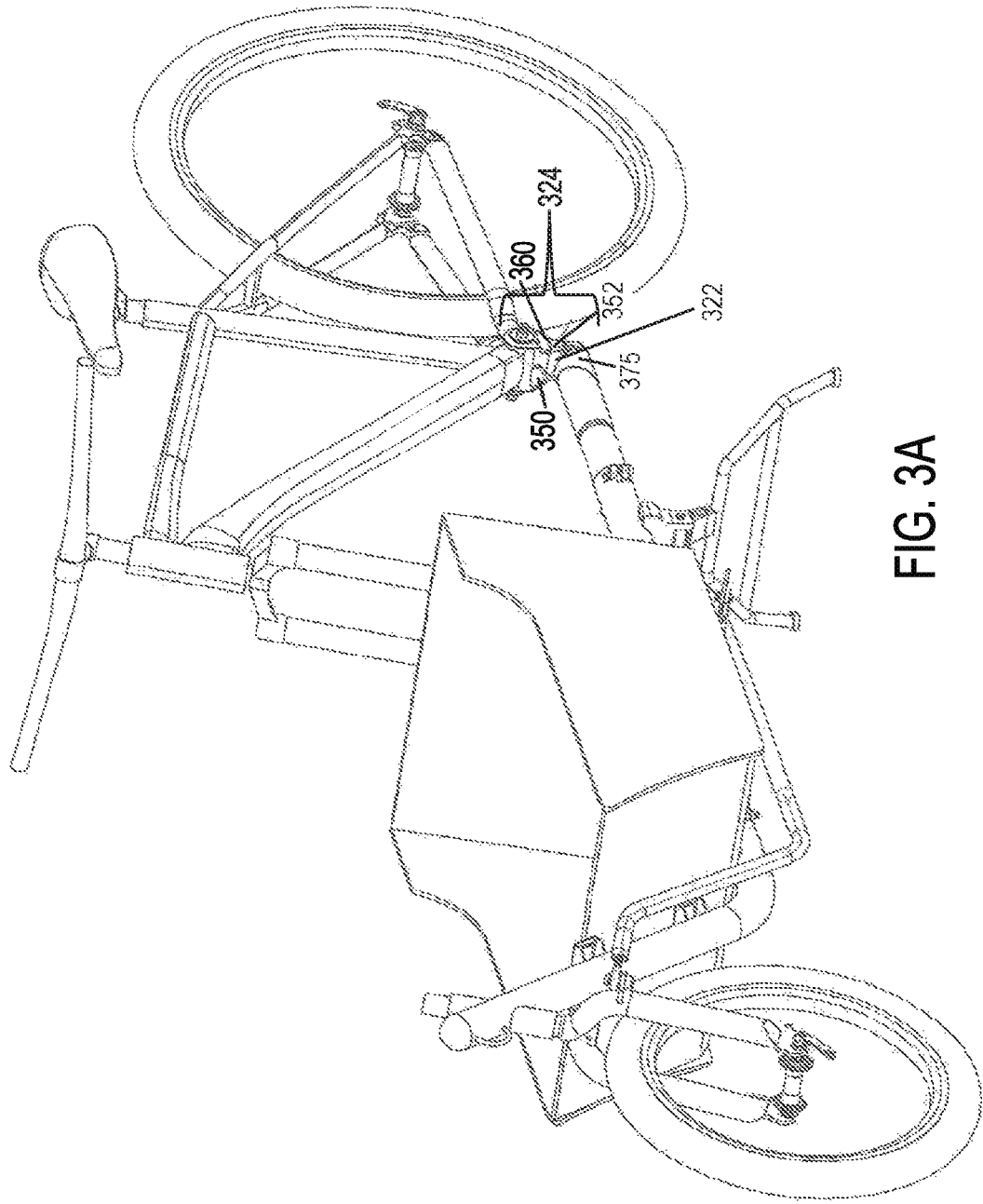
FIGS. 3A-3H are representative images of the frame coupling component and its attachment to the nub mount shell area of a subject bicycle, according to one embodiment of the present disclosure.
Figure 3B:
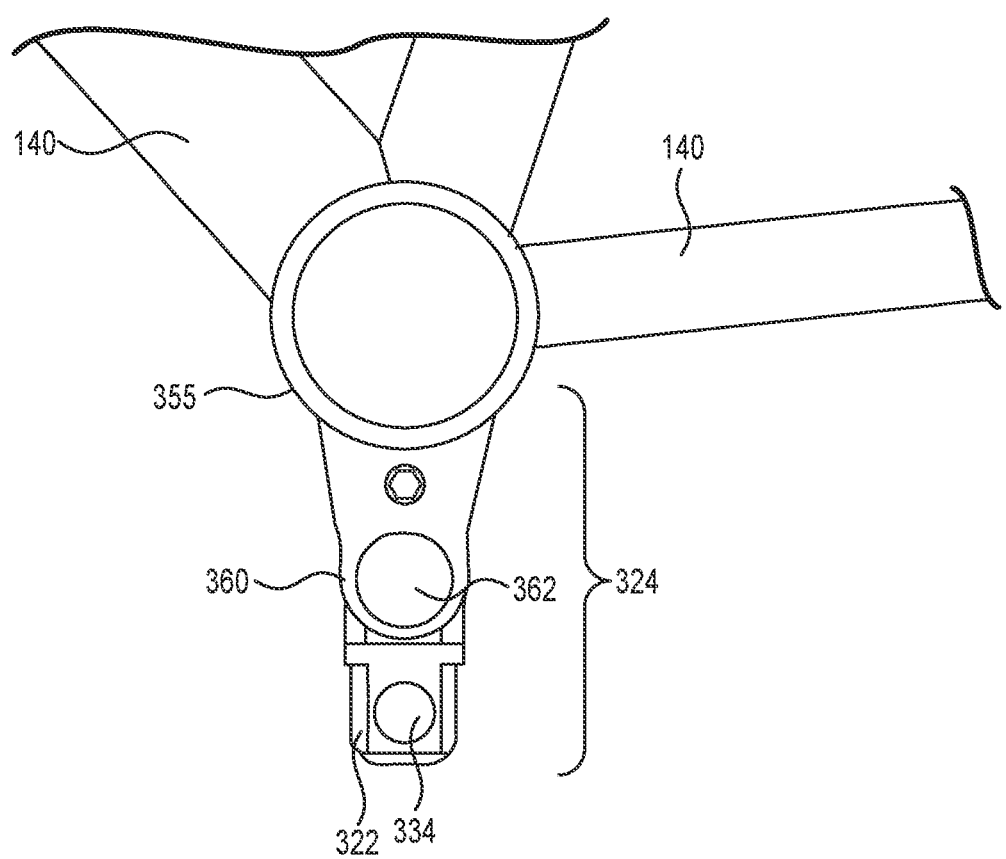

In some embodiments, the nub mount assembly 324 may be comprised of a plurality of frame connection plates 350, 360, at least one nub mount 322, and at least one thru bolt 380, e.g., quick release skewer. In some embodiments, the nub mount assembly 324 may comprise a first frame connection plate 350 having a female bottom bracket tube 352 extending inwardly and laterally therefrom, into which a second bottom bracket 360 having a male bottom bracket tube 362 extending inwardly and laterally therefrom may be inserted thereby creating a contiguous and slidably adjustable tube between the frame connection plates from which the nub mount 322 may be suspended by inserting and coupling the tubes 352, 362 through nub mount aperture 335 (see. FIG. 3D). The nub mount assembly may optionally further comprise at least one lock ring. As shown in FIG. 3B, in some embodiments, the nub mount assembly 324 comprises a bottom bracket shell 355, a nub mount shell 320, frame connection plate 360, and a nub mount 322. Which are detachably coupled to the frame 110 of the subject bicycle.

Figure 3C:
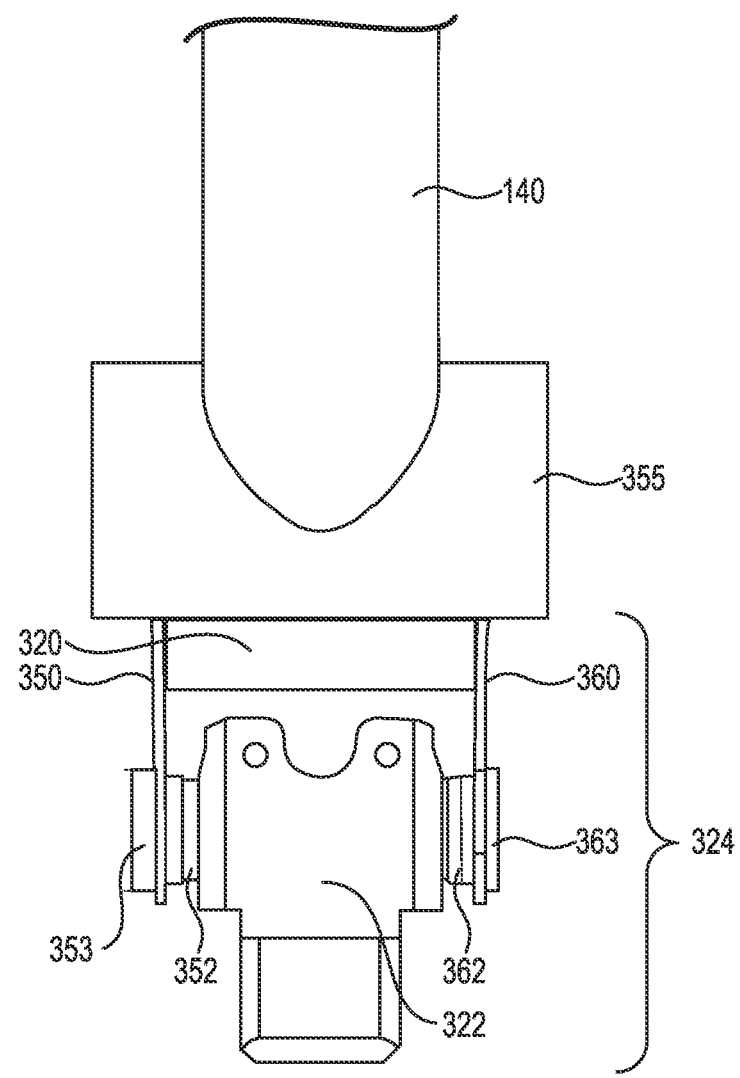
Figure 3D:
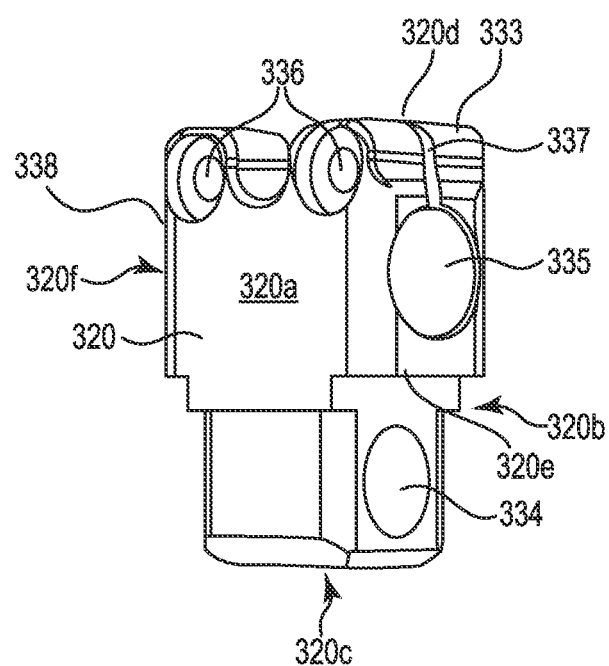

From a front perspective, shown in FIG. 3C, the bottom bracket shell 355 and the nub mount shell 320 are part of the subject bicycle frame 110, onto which the nub mount assembly 324, comprising frame connection plates 350, 360, having corresponding male:female lateral tubes 352, 362 extending inward therefrom, a nub mount 322, and thru bolt 380, are coupled.

The nub mount 322, shown in FIG. 3D may be constructed by, e.g., casting, machining, molding, carving, and the like, and combinations and variations thereof, from metal, resin, composite, plastic, or other dense material appropriate in weight and strength. The nub mount carries the general shape of a rectangular block having a front surface 320a, a back surface 320b, a top 320d, a bottom 320c, and two opposing side surfaces, 320e, 320f. Located in the general top portion, preferably the top half, of the nub mount 322 is at least one fastener, e.g., pinch bolt, receiving means comprised of an aperture 336 from the front surface 320a through to the back surface 320b of the nub mount 322 for tightening the upper key hole aperture 335 running from the first side 320e through to the second side 320f Moving from the top 320d to the bottom 320c of the nub mount 320, the nub mount may have straight corners defining each plane, or may shaped, e.g., machined, for a narrower profile, e.g., smaller size cross-section, on the bottom portion, preferably bottom half of the nub mount 320, through which a second aperture 334 runs from the first side 320e to the second side 320f Each of the apertures 334, 335 through the may be utilized to integrate and couple the nub mount 320 to the nub mount assembly 324, and once installed onto the bicycle frame 110, in turn, couple the assembly to the cargo conversion frame. In some embodiments, one or more apertures may be pinched using fasteners to decrease the diameter.

Once the frame coupling component is fully assembled, the bottom 320c of the nub mount 320 is inserted into the rear frame nub mount receiver 375 cavity 378 and the corresponding apertures 334, 376, 377 are aligned. A thru bolt is inserted and engaged through aperture 376, through aperture 334 to the opposing and threaded aperture 377. The thru bolt 380 is then tightened.

Figure 3E:
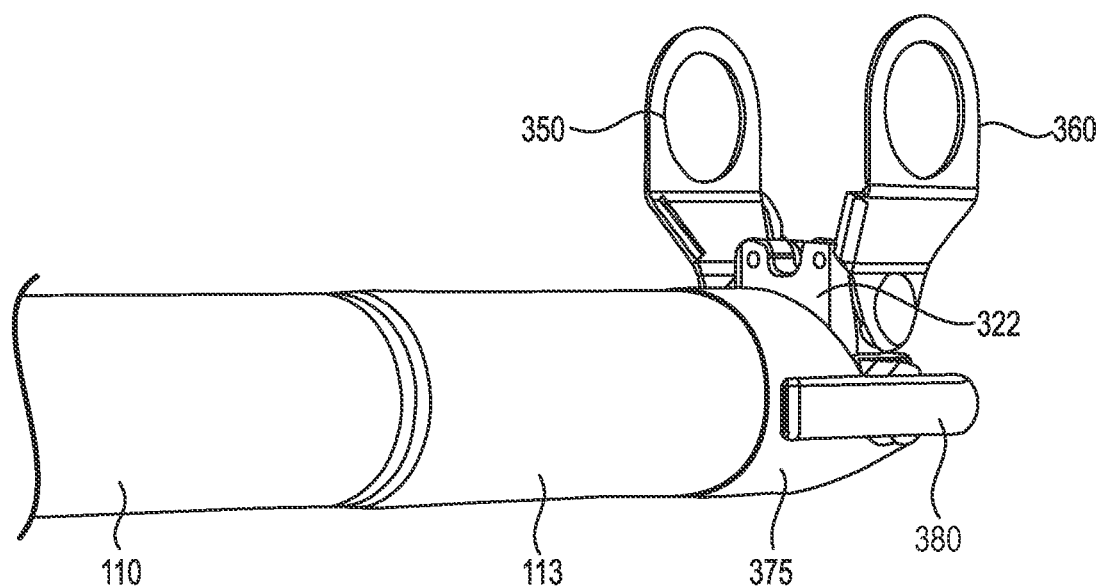
Figure 3F:
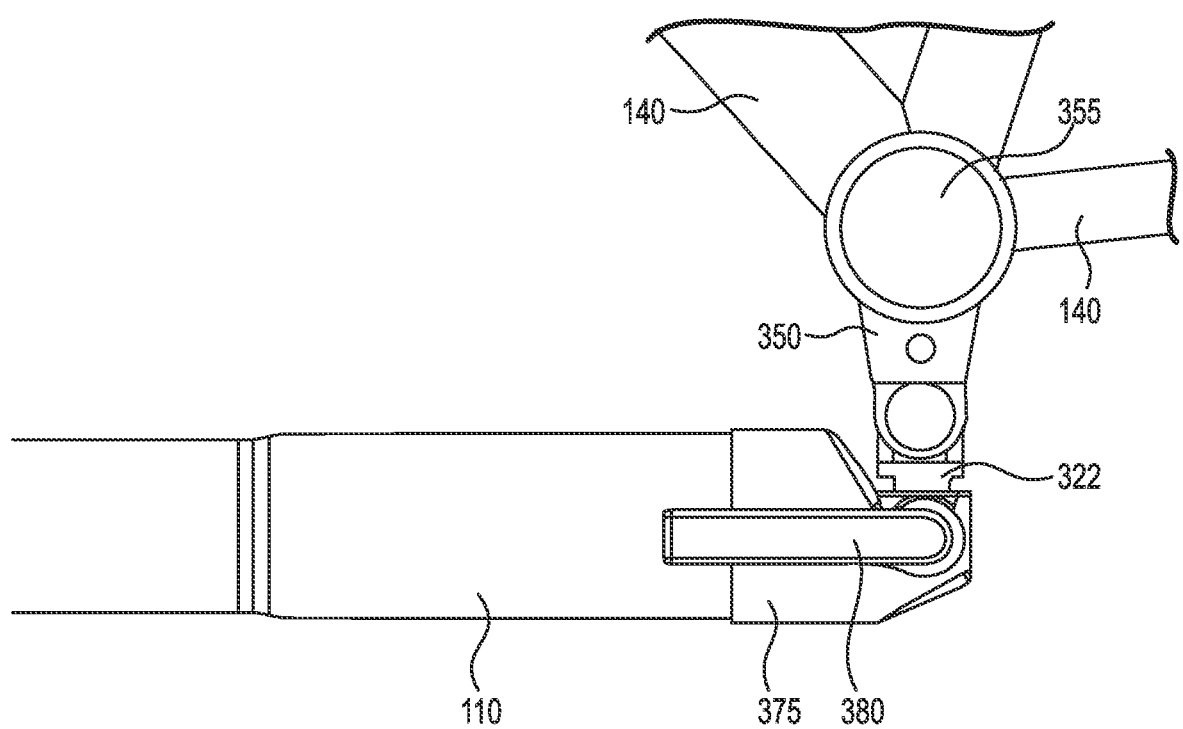
Figure 3G:
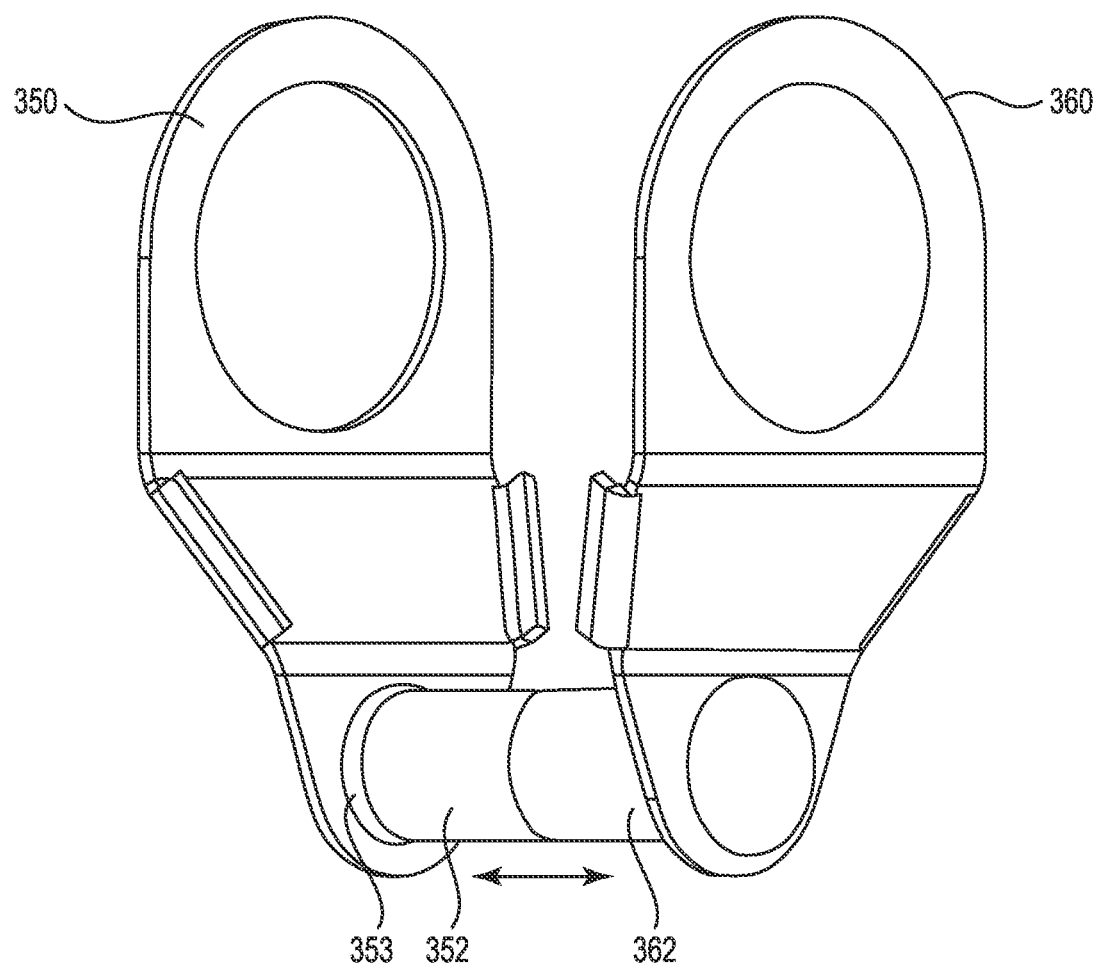
Figure 3H:
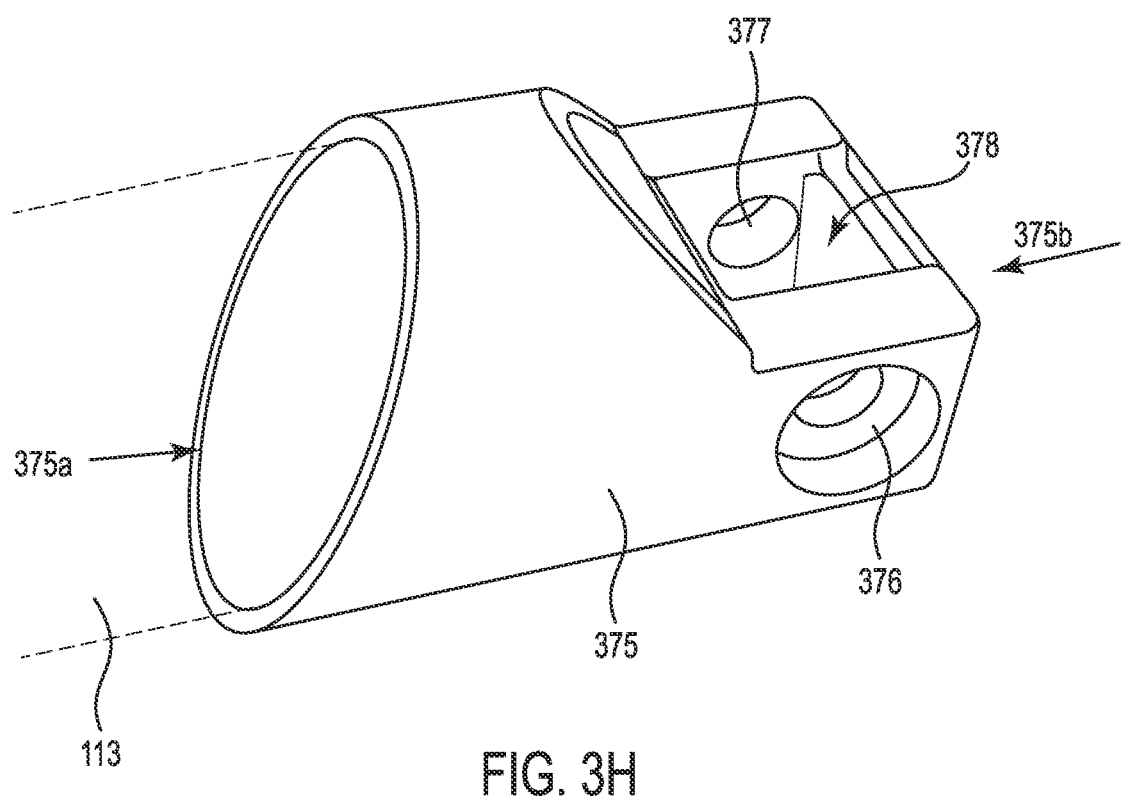

As shown in FIGS. 3D, 3E, and 3G, a first frame connection plate tube 352 is inserted into and through the upper aperture 335 of the nub mount 320. A second frame connection plate tube 362 is inserted into the opposing upper aperture 338 of the nub mount 322 and slidably coupled to the first frame connection plate tube 352. The first and second frame connection plates 350, 360 are thus oriented in a parallel alignment prior to installation with the nub mount 320 disposed therebetween and oriented such that the nub mount bottom 320c is directed downward from the connection plates 350, 360 (see, FIGS. 3B and 3C). After alignment, fasteners, e.g., screws, bolts, are inserted into pinch bolt apertures 336 on the top 320d of the nub mount 320, and tightened to secure the frame connection plate tubes 352, 362 in position. For perspective, a side view of the nub mount assembly 324 fully engaged and mounted on the subject bicycle 140 and coupled to the cargo conversion frame 110 is depicted in FIG. 3F.

The side perspective of the detachably coupled nub mount assembly 324 and nub mount receiver 375 engaged with a conversion frame 110 and engagement of the nub mount assembly, includes the adjustable frame connection plates 350, 360 and nub mount 320, fully engaged with the cargo frame of the subject bicycle. For coupling the nub mount assembly 324 to the cargo conversion frame 100, a nub mount receiver 375 is permanently or semi-permanently mounted, e.g., welded, onto the proximal end of the rear conversion frame 113. The nub mount receiver 375 (see, FIG. 3H) may be configured, e.g., cast, as a cap that fits over the proximal end of the rear conversion frame 113 having a first end 375a configured to have the proximal end the conversion frame 113 inserted therein, and a second opposite end configures. e.g., machined, to have a certain central cavity 378 to receive and secure the nub mount 322 on a first plane and an aperture therethrough on a second perpendicular plane through which a fastener, e.g., through bolt 380, is secured to couple the nub mount assembly 324 thereto. The nub mount receiver 375 may be constructed of, e.g., metal, steel, resin, carbon fiber, polymer, or the like, and variations and combinations thereof. Preferably, the nub mount receiver 375 is constructed of stainless steel. The nub mount receiver may be fabricated by molding, 3D printing, casting, machining, welding, or the like, and variations and combinations thereof. By way of example, the nub mount receiver 375 may be fabricated from the same or similar construction material as the conversion frame 110 on which it is mounted. The nub mount receiver 375 may carry the same general shape as the conversion frame 110, e.g. tubular, for ease of coupling. In use, the nub mount 322 is inserted into the nub mount receiver cavity 378, such that the nub mount aperture 334 and receiver apertures 376, 377 are aligned and may be detachably coupled via threaded thru bolt 380. In some embodiments, the nub mount receiver 375 may further comprise additional securing mechanisms, e.g., pinch clamp (not shown).

Returning now to the nub mount assembly 324, in some embodiments, two frame connection plates 350, 360 are coupled, one on each side, to the nub mount shell 320 of the subject bicycle 140. A frame connection plate is generally comprised of a flat sheet or strip of material, e.g., metal or other material, having a general top, bottom, and sides. In some embodiments, the frame connection plates disclosed herein are oval m overall shape with a mid-crosscrimp, e.g., s-bend, however, any overall plate shape not interfering with the functionality of the plate or other system or bicycle components may be employed. In some embodiments, each plate may further comprise at least one side tab 351, e.g., to provide additional structural integrity. In some embodiments, each plate has an upper aperture 356, i.e., located in the upper half of the plate, e.g., above the s-bend, and a lower aperture 357, i.e., located in the lower half of the plate, e.g., below the s-bend. In some embodiments, an inwardly extending male and corresponding female lateral tube is permanently attached, e.g., welded to the inner surface of the lower aperture 357 of the frame connection plates 350, 360 (See, FIG. 3G). More specifically, in some embodiments the plates have integrally combined male and female tubes extending inwardly and laterally therefrom in place of a lower aperture and may be installed in similar process to plates having upper and lower apertures. Once coupled to the nub mount shell, the nub mount assembly can remain in place with or without the attachment of the remaining components of the cargo bicycle conversion system installed, i.e., the nub mount assembly can be installed on and attached to the subject bicycle 140 without interfering with its pedaling, electric motor, or other functions. In some configurations and embodiments, a nub mount assembly can be permanently coupled to the frame of the subject bicycle 140, and/or the subject bicycle can be manufactured to include a nub mount assembly as part of its structure. Generally, the nub mount assembly 324 resides on the subject bicycle and the numb mount receiver 375 and corresponding thru bolt 380 reside on the cargo conversion frame.

By way of example, frame connection plates 350, 360 may comprise an about 1.5 mm thick plate of steel having an about 30.9 mm diameter upper aperture 356, and a lower about 12 mm tubes situated about 53.5 mm below (center to center) the upper aperture. In some embodiments, an s-bend offsets the upper aperture 356 and proximal end of the lateral tubes 352, 362 lower, e.g., by about 3 mm while remaining in a parallel plane.

A nub mount shell 320 may have permanently or semi permanently disposed thereon a nub mount assembly 324 for engagement with the rear conversion frame 113. The nub mount 320 may be mounted, attached, or manufactured to extend downward from and below the bottom bracket shell 355 of a standard bicycle or motor mount 600 (see, FIG. 6A) for a mid-electric motor bicycle via, e.g., welding, casting, machining, extrusion, or any other process now known or known in the future that would not produce a weakened attachment point, i.e., nub mount shell 320. Alternatively, the nub mount shell 320 may be positioned in any configuration in relation to the bottom bracket shell 355 or motor mount 600 that allows for engagement with the rear conversion frame 113.

More specifically, the adjustable frame connection plates having lateral tubes extending therefrom are illustrated in FIG. 3G. The configuration of the frame connection plates allows for adjustability in width (i.e., space between the plates) and thus may accommodate correspondingly variable widths of bottom bracket shells or motor mounts via engagement of the male and female tubes or the nub mount. FIG. 3D illustrates an isolated view of a nub mount, which may lock the width of the frame connection plates to a fixed distance from one another, and serve as an interface with the cargo conversion frame. In some embodiments, the nub mount may have one or more lateral apertures therethrough, e.g., at least one upper aperture may have adjustable circumference, and thus, diameters, via engagement of pinch bolts, while a lower aperture may be configured to have no adjustability in its circumference or diameter.

By way of example, a frame connection plate tube may comprise, e.g. a steel shaft female component about 36 mm long×25 mm diameter and a steel shaft corresponding male component about 46 mm long×25 mm diameter, and about a 12 mm internal diameter corresponding to the internal diameter of the female component and the outside diameter of the thru bolt, and a 19 mm flats on the outside at the 12 mm opening.

Bicycles vary in three primary ways. They can have different length main tubes (e.g., top tube length of about 56 cm), different head tube angles (e.g., about 71 degrees), different fork rakes (e.g., about 42 mm) and bottom bracket width (e.g., about 68 mm). Because bicycle frames range in size, the frame coupling components 120 of the present disclosure are generally adjustable such that they can facilitate the proper attachment of the cargo conversion frame 110 to the subject bicycle 140. Some embodiments of the cargo bicycle conversion system of the present disclosure, may include frame coupling components that detachably couple the cargo conversion frame 110 to various portions of the frame of a subject bicycle 140. For example, a frame coupling component can include a down tube adapter configured to couple the cargo conversion frame 110 to a portion of the down tube on the subject bicycle 140. In another embodiment, a frame coupling component can include a seat tube adapter configured to couple the cargo conversion frame 110 to a portion of the seat tube on the subject bicycle 140. In yet another embodiment, a frame coupling component can include a top tube adapter configured to couple the cargo conversion frame 110 to a portion of the top tube on the subject bicycle 140. In another embodiment, a frame coupling component can include a mid-electric motor mount adapter configured to couple the cargo conversion frame 110 to the motor mount of the subject bicycle 140. As one of ordinary skill in the art would readily recognize based on the present disclosure, more than one frame coupling component can be used to detachably couple the cargo conversion frame 110 to a subject bicycle 140 at more than one position on the frame of the subject bicycle 140. In some embodiments, one or more additional components can be attached to a portion of the frame of a subject bicycle, and these additional components can facilitate the connection of the cargo conversion frame 110 to the subject bicycle 140.

Figure 4B:
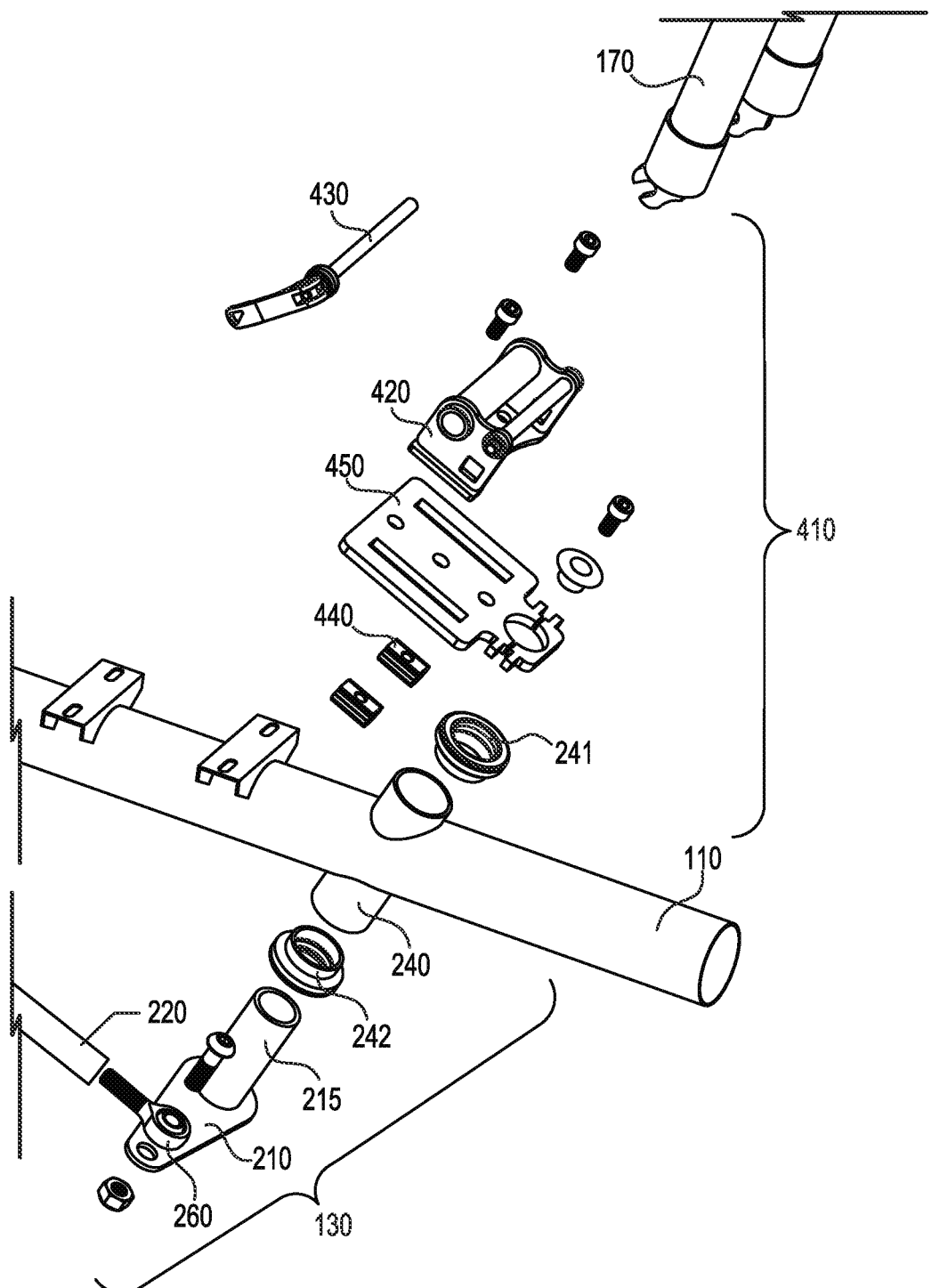

As illustrated in FIGS. 4A-4D, a steering adapter system 125 may be comprised of a fork coupling assembly 410 and a steering assembly 130 (See, FIG. 2A). The steering adapter system 125 allows a steering convertor 210 to be functionally coupled to the fork 170 of the subject bicycle 140 through a fork coupling assembly 410. The fork coupling assembly 410 comprising a fork mount component 420 and a fork rake adjuster plate 450 (see. FIG. 4A) is rotatably coupled to the steering assembly 130. In some embodiments, the fork coupling assembly 410 further comprises an axle 430 by which the fork of the subject bicycle 140 attaches to the fork coupling assembly 410. As discussed herein, the fork coupling assembly 410 facilitates the functional coupling of the steering convertor 210 to the fork 170 attached to the subject bicycle 140. As the rider actuates the handlebars 160 of the subject bicycle 140, the fork coupling assembly 410 ensures that the movement of the handlebars 160 is converted in a 1:1 ratio to corresponding movement in the steering assembly 130, e.g., via a steering convertor 210, and ultimately translated to the fork 230 attached to the cargo conversion frame 110, thus facilitating ease of steering the cargo bicycle. As would be readily recognized by one of ordinary skill in the art based on the present disclosure, the fork 170 of the subject bicycle 140 can be attached to the fork coupling assembly 410 through various mechanisms, including but not limited to, a quick-release mechanism, i.e., thru axle 430, as illustrated in FIG. 4B, or a nut and bolt mechanism (not shown), or other mechanisms known in the art. Other mechanisms may include, but are not limited to, quick release skewers, thru axle skewers, straps, a solid axle with nuts, thru axles, fork pinching mechanisms, and combinations and variations thereof. In some embodiments, the components of the fork coupling assembly 410, i.e., fork mount component 420 and fork rake adjuster plate 450, can be attached to each other by welding, pinch bolts, bolt and nut combinations, and/or machined from a solid piece of material.

For purposes of clarity, FIG. 4B illustrates an exploded view of individual components of the an embodiment of the steering adapter system 125, i.e., fork mount assembly 410 and steering assembly 130, of present invention and how they may relate to one another, but is not intended to be comprehensive or limiting. FIG. 4B is intended to be non-limiting and exemplary only.

Figure 4C:
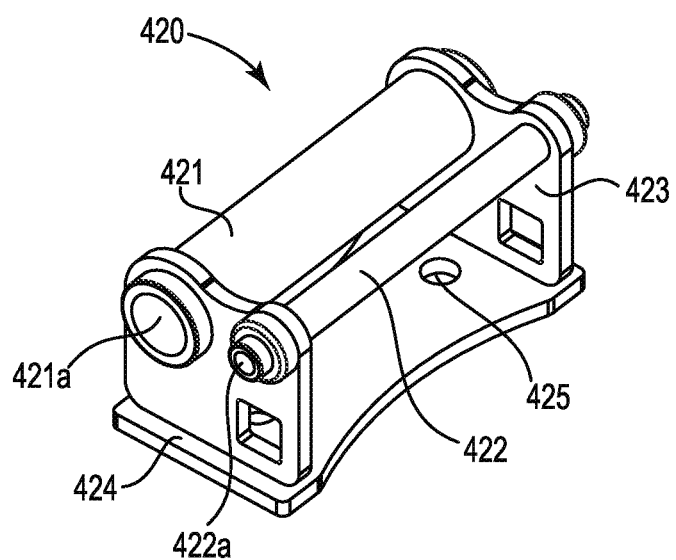
Figure 4D:
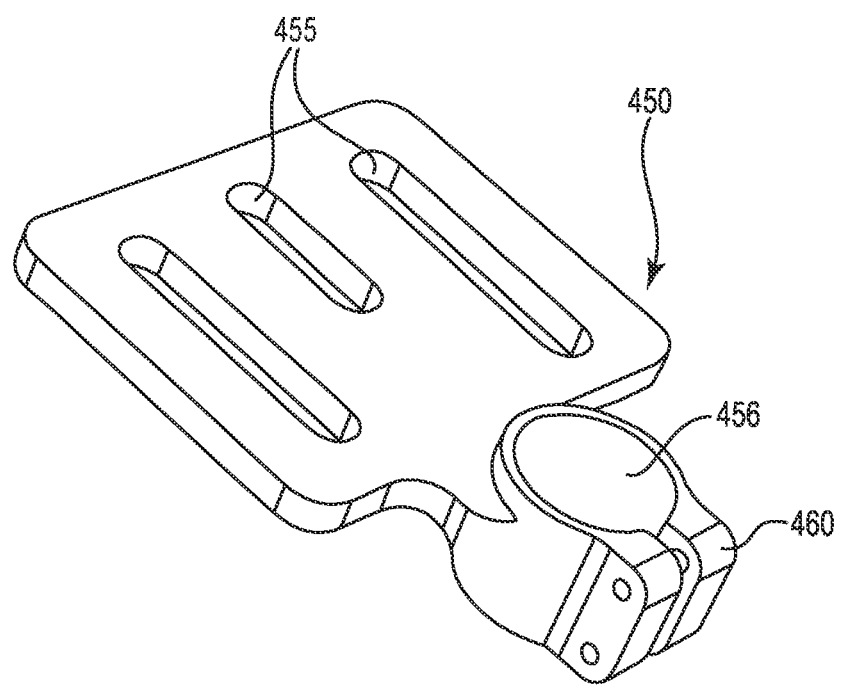

In some embodiments, a fork mount assembly 410 may be comprised of a fork mount component 420, see FIG. 4C, and fork rake adjuster plate 450, see FIG. 4D, wherein the fork mount component 420 is adjustably coupled to the fork rake adjuster plate 450 via, e.g., T-nuts 440. The upper end of the assembly, i.e., the fork mount component 420, receives the fork 170 of the subject bicycle 140, wherein the fork 170 is secured thereto via, e.g., a thru bolt 430 that may or may not be of a quick release style.

Fork mounts having a single mount for use with various bicycles are known in the art. As depicted in FIG. 4C, a fork mount component 420 of the present invention may be comprised of a base plate 424 corresponding generally but not necessarily in relative size to a fork rake adjuster plate 450, at least one or preferably a plurality of fork mount supports 423 extending generally vertical there from, and at least one, or preferably a plurality of fork mounts 421, 422, e.g., 9 mm and 15 mm, mounted on and/or piercing the at least one fork mount support 423, wherein the fork mount or mounts further comprise an aperture extending there through 421a, 422a for receiving a thru bolt 430 or the like. In a fork mount component 420, the base plate 424 may further comprise at least one coupling aperture 425 through which fastening means may be insert for coupling purposes, e.g., coupling to a fork rake adjuster plate. In some embodiments, a fork mount assembly 410 may comprise a single, unitary component comprising a fork mount component 420 and a fork rake adjuster plate component 450 integrally combined via fabrication, welding, or the like. In some embodiments, the fork mount component 420, may comprise a plurality of individual mounts accommodating different size subject bicycle forks 170, e.g., 9 mm and 15 mm, the fork mount component 420 adjustably and slidably coupling with the fork rake adjuster plate 450 with one or more fastening means for providing fore and aft adjustability.

An exemplary embodiment of fork rake adjuster plates 450, depicted in FIG. 4D, comprising a plate 450 comprising at least one, or preferably a plurality of, elongated apertures 455 there through, and at least one pinch clamp aperture 456 corresponding generally in size and shape to a standard bicycle head tube facilitating, via, e.g., pinch clamps, coupling thereto. Multiple additional variations and embodiments falling within the scope of this disclosure are possible and may be recognized by the skilled artisan. Each embodiment encompasses a fork mount component 420 that may be slidably coupled to a fork rake adjuster plate 450 by, e.g., inserting t-nuts 440 (FIG. 4B) up through the elongated aperture 455 of the plate 450, aligning the fork mount component coupling aperture(s) 425, and securing the t-nuts 440 with corresponding fastening means, e.g., bolt. The fork mount component 420 may be slidably adjusted in relation to the fork mount adjuster plate 450, i.e., fore and aft, to adjust the rake of the subject bicycle fork 170 by loosening the coupling means. i.e., t-nuts 440, slidably adjusting the fork mount component 420, and re-tightening the coupling means to secure the adjustment into place. The fork rake adjuster plate 450 of the present disclosure facilitates the installation and effective integration into the present cargo bicycle conversion system the use of bicycle forks having different rake in comparison to the cargo conversion system fork 230 of the present invention. The fore and aft adjustability of the fork mount component 420 in relationship to the fork rake adjuster plate 450 allows for a variety of styles of bicycle forks to be utilized with the present invention without sacrificing or losing steering capability and/or control.

The fork rake adjuster plate 450 is rotatably coupled to a steering arm 250 having a distal end steering converter flange 210 extending there from, wherein the steering arm 215 passes through a channel or aperture, i.e., a head tube. 240 mounted through, e.g., piercing, the conversion frame 110, such that the steering converter flange 210 is appropriately positioned and may engage with and rotatably couple to the proximal end of the steering linkage 220.

Returning now to FIG. 4A, it is shown that the steering arm 215 (not shown) having a steering converter flange 210 is seeded through a head tube 240 having and upper bearing headset 241 and a lower bearing headset 242, to which a fork coupling assembly 410 comprised of a fork rake adjuster plate 450 and fork mount component 420 is rotatably coupled via, e.g., the fork rake adjuster plate pinch clamp 460 and/or the upper headset 241. A subject bicycle fork 170 may be removeably coupled to the fork coupling assembly 410) as shown in FIG. 4E. As depicted in FIGS. 2A-C, the steering adapter system 125, comprised of a steering assembly 130 and fork coupling assembly 410, translates the movement of the subject bicycle fork 170, through the steering converter flange 210, to the conversion fork 230.

Additionally or alternatively, the steering adapter system 125 can include the functional extension of the steering mechanism, e.g., handlebars 160, of the subject bicycle 140 to the fork 230 or wheel 250 attached to the cargo conversion frame 110. For example, one or more coupling components can be used to connect a portion of the subject bicycle's steering mechanism to, for example, the fork 230 attached to the cargo conversion frame 110. This configuration embodiment allows the rider to steer the cargo bicycle via direct steering and without the inclusion of fork coupling components or a steering convertor. In such embodiments, a steering linkage can be configured, e.g., to extend lengthwise along a top portion of the cargo container as the steering adapter system 125 extends directly from the subject bicycle 140 to the fork 230 attached to the cargo conversion frame 110. As the rider actuates the handlebars 160 of the subject bicycle 140, the coupling component(s) ensures that the movement of the handlebars 160 is converted to corresponding movement in the fork 230 attached to the cargo conversion frame 110, and thus, steering the cargo bicycle.

Figure 5A:
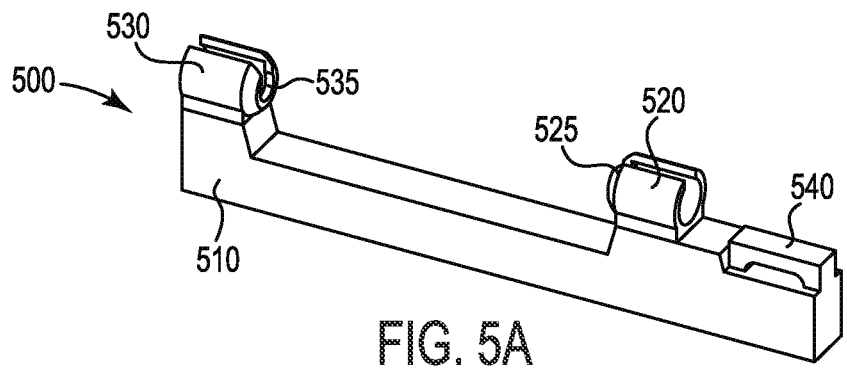
FIGS. 5A-5C are representative images of components of a brake cable split housing system, according to one embodiment of the present disclosure.
Figure 5B:
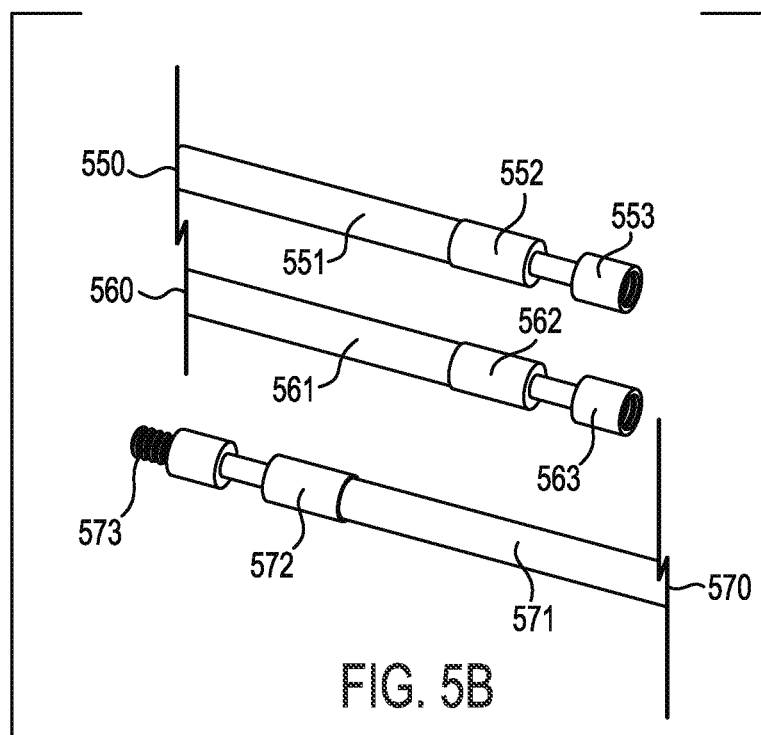
Figure 5C:
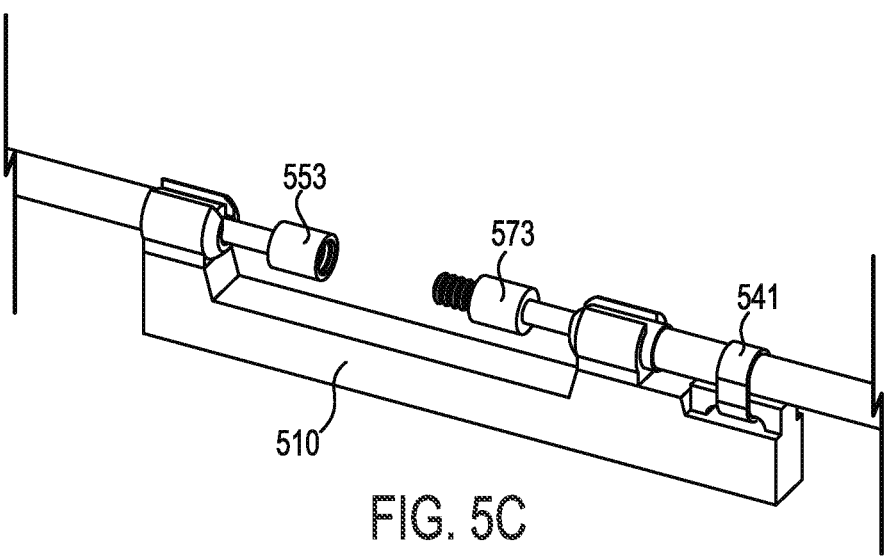

Turning now to FIGS. 5A-C, a brake cable split holder and brake cables are depicted. As shown in FIG. 5A, a brake cable split holder 500 comprising a base element 510, a first housing stop 520, a second housing stop 530, and a cable fastening bridge 540. The brake cable split holder may be constructed or manufactured from any number of materials, e.g., grass (bamboo), wood, paper, plastic, metal, metal alloys, polymeric material, carbon fiber, and combinations and variations thereof. FIG. 5A shows one embodiment of a brake cable split holder 500 having an elongated base body 510 with a first cable housing stop 520 disposed on one end of the base 510, and a second cable housing stop 530 disposed on about the opposite end of the base body 510. Extending beyond the first cable housing stop 520 is a tab having disposed thereon a cable fastening bridge 540, where under a fastening means, e.g., cable tie, may be inserted for securing a cable, e.g., subject bicycle brake lever cable, to the brake cable holder 500. Each of the cable housing stops. 520, 530, comprise a tube-like configuration having a graduated slot-aperture there through 525, 535, wherein the outer-facing slot aperture diameter is larger than and narrows to a smaller inner-facing slot aperture diameter, and wherein a slot aperture runs from the outer to the inner ends of the cable housing stops and is capable of receiving a cable of standard size inserted there through.

Standard brake cables used for bicycle brakes are comprised of an inner wire, or cable, an outer housing, and a housing end cap. As is known in the art, in general, when the brake caliper of a bicycle is engaged it pulls the cable through the housing and the housing pushes back with an equal amount of force. The cable housing's ability to maintain force, e.g., compression, therefore corresponds directly to the amount of force a cable may translate through the housing. Thus, in order to stop a bicycle, a rider squeezes a brake lever on the handlebar of the bicycle to which a cable originating from, e.g., calipers on the front wheel, is functionally coupled, thereby engaging the calipers, and in turn engaging brake pads that press against the wheel.

The brake system of the cargo bicycle conversion system of the present invention, through the brake cable split holder translates the subject bicycle brake cable lever engagement (pull) from the brake lever of the subject bicycle, through a brake cable to a front wheel brake either of the subject bicycle brake caliper or the cargo frame brake caliper. In order for the power of the brake cable to be accordingly transferred (through the connecting parts), the brake cable split holder 500 is functionally inserted into the brake system of the cargo bicycle conversion system and connected such that engagement of the brake lever of the subject bicycle pulls the coupled cables within the coupled housings. The brake cable splitter functionally couples the subject bicycle brake cable and the selected brake caliper cable. The brake cable split holder functionally couples the subject brake cable housing and the select brake caliper housing.

As depicted in FIG. 5B, in one embodiment of the braking system of the present invention is comprised of: a cargo conversion brake caliper cable 550 having a cable housing 551, the distal end of the cable functionally coupled to the brake caliper of the cargo conversion system, the proximal end further comprising a housing end cap 552 and a female cable splitter 553 mounted to the proximal terminus; a subject bicycle brake caliper cable 560 having a cable housing 561, the distal end of the cable functionally coupled to the brake caliper of the subject bicycle, the proximal end further comprising a housing end cap 562, and a female cable splitter 563 mounted to the proximal terminus; and a subject bicycle brake lever cable 570 having a cable housing 571, the distal end of the cable functionally coupled to the brake lever of the subject bicycle, the proximal end further comprising a housing end cap 572, and male cable splitter 573 mounted to the proximal terminus.

As shown in FIG. 5C, the cable housing stops 520, 530 act as a receiving socket for the cable(s) 550, 560, 570 and corresponding cable housing 551, 561, 571, each cable housing stop having corresponding apertures 525, 535 through which each cable may pass. In one example, the proximal end of the cable and housing of the subject bicycle brake lever cable 570 is received by the first end of the brake cable split holder, wherein the cable housing is fitted into and through the first cable stop 520 and cable stop aperture 525. The proximal cable terminus continues through the aperture 525 of the cable stop 520 to about the center of the brake cable stop housing body before a first cable splitter, e.g., male cable splitter, is mounted thereon, e.g., mechanically attached.

The brake cables of the cargo conversion frame brake caliper 550 and the subject bicycle brake caliper 560 each have a corresponding and opposite cable splitter, e.g., female cable splitter, mounted to their respective proximal termini, e.g., mechanically attached. Each of the respective brake cables of the cargo conversion frame 550 and the subject bicycle 560 have brake cable housings that are long enough such that the proximal end of the cable is able to reach to and engage with the brake cable split holder. Thus, a brake cable and housing selected and engaged either from the cargo conversion frame 550 or the subject bicycle 560 will determine which brake will be pulled by the force produced by engagement of the subject bicycle brake lever. For example, when the cargo bicycle conversion system of the present invention is engaged with a subject bicycle, the brake cable and housing corresponding to the cargo conversion frame will functionally couple to the brake cable split holder such that actuation of the subject bicycle brake lever actuates the brake of the wheel mounted on the cargo conversion frame. Functional engagement of the selected brake cable terminus comprises, e.g., inserting the brake housing and cable from the selected caliper into the second and opposite housing stop 530 of the brake cable split housing. The caliper housing inserts into the cable stop and the cable splitter from the brake caliper cable may be functionally engaged with the subject bicycle brake lever cable by threading the female cable splitter into the male cable splitter mounted on the subject bicycle brake lever cable. Thus, the force produced by the pull of the overall cable, e.g., the subject bicycle brake cable combined with the connected brake caliper cable, is shared by the housing of the subject bicycle lever cable, the body of the brake cable split housing and the housing of the caliper cable, allowing the force exerted on the cable by the subject bicycle brake lever to be translated to the select brake caliper.

In some embodiments, the subject bicycle brake lever cable 570 is secured to the brake cable split holder 500) via an attachment means 541, e.g., cable tie or the like. (See, FIG. 5C). The cable 670 may be secured by inserting the attachment means through the aperture created between the cable fastening bridge 540 and the brake cable split holder base 510, engaging the attachment means about the cable 570, and thereby preventing the brake cable split housing from moving and/or falling off the subject bicycle, e.g., when shifting between the cargo conversion brake caliper and the subject bicycle caliper.

Figure 6A:
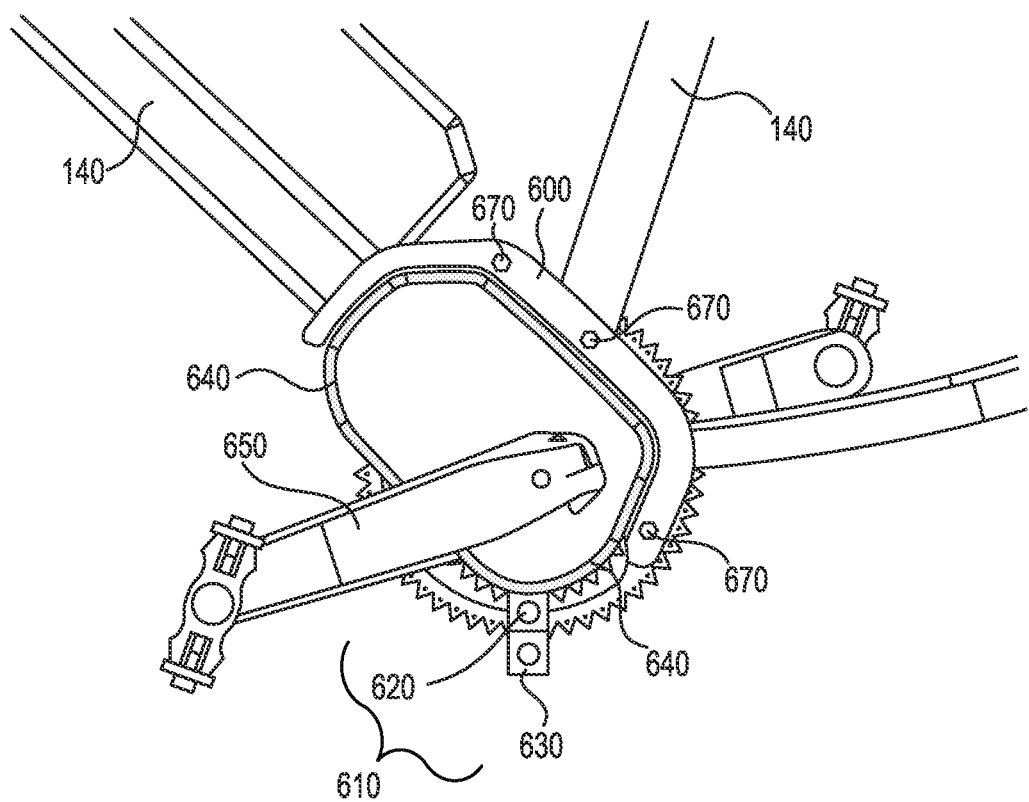
FIGS. 6A-6C are representative images of the frame coupling component and its integration with a mid-electric motor subject bicycle, according to one embodiment of the present disclosure.
Figure 6B:
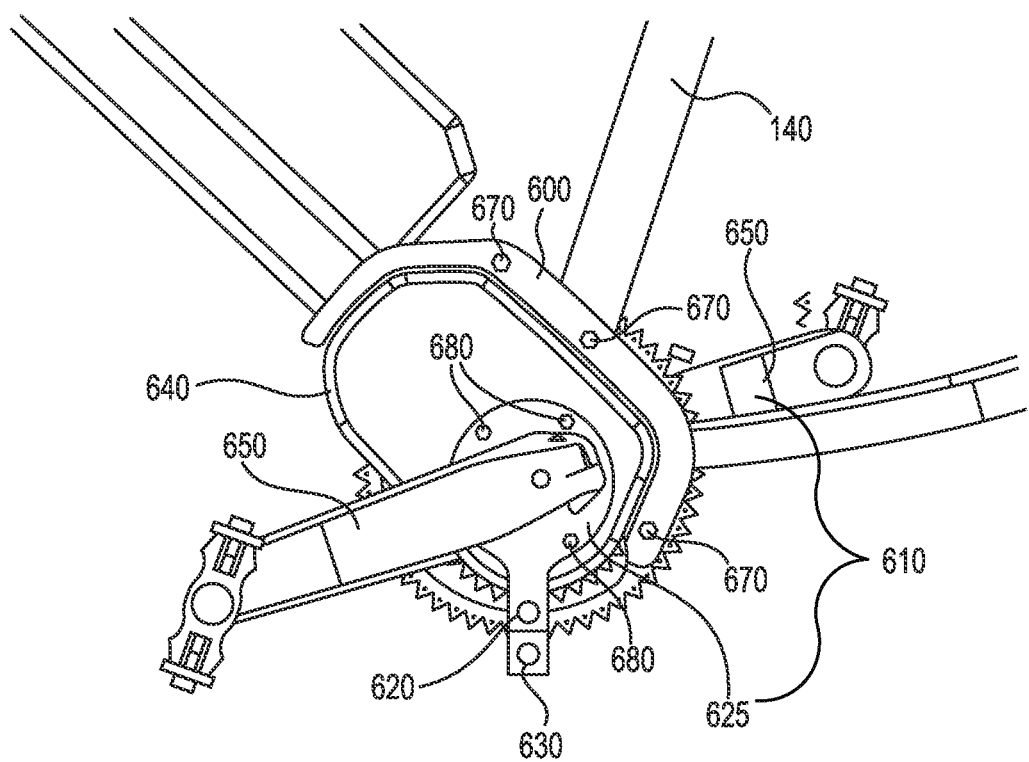
Figure 6C:
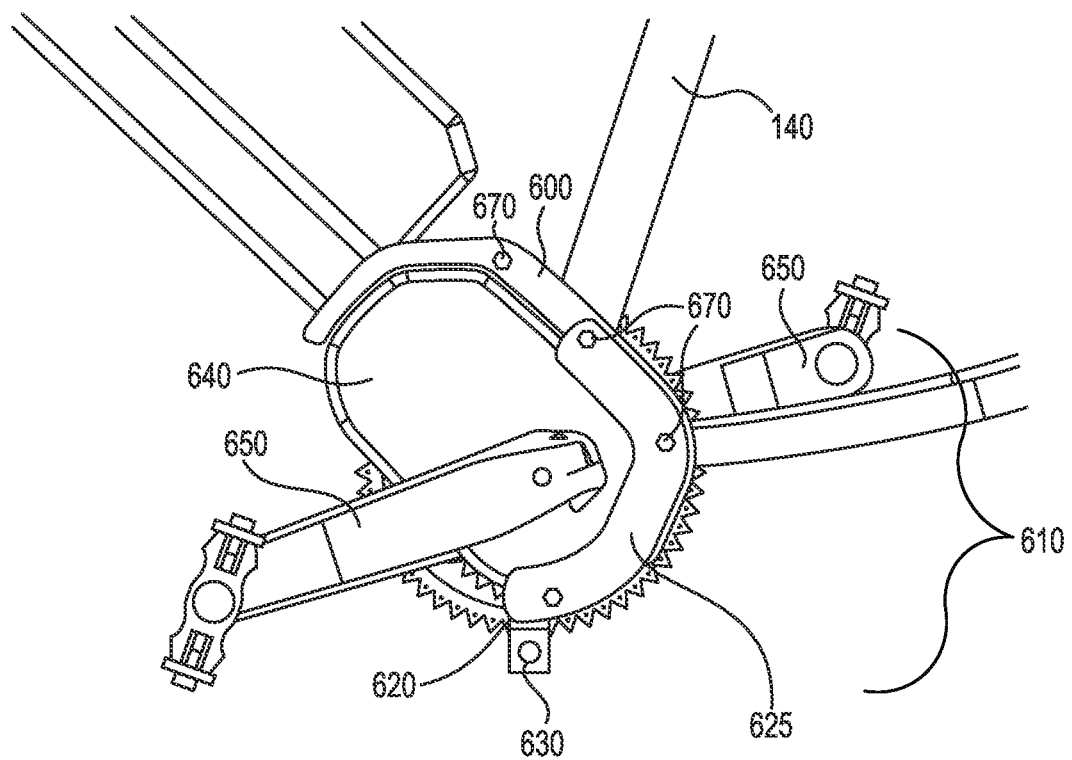

As illustrated in FIGS. 6A-6C, the cargo bicycle conversion system of the present disclosure includes various coupling components for attaching, detaching, and reattaching the cargo bicycle conversion system of the present disclosure to a subject bicycle having a mid-electric motor. In some embodiments, a manner of attachment of the cargo bicycle conversion system of the present disclosure includes at least one frame coupling component comprised of motor mount adapter with which a nub mount shell integrally combined, and to which a nub mount assembly may be coupled (FIG. 6A). In some embodiments, a manner of attachment of the cargo bicycle conversion system of the present disclosure includes at least frame connection plate and at least one nub mount shell, to which a nub mount assembly may be detachably coupled (FIGS. 6B and 6C). Embodiments of frame connection plates for motor mounts may comprise one or a plurality of motor mount bolts, placement of which may be standard or specialized.

A cargo bicycle conversion system of the present disclosure, as depicted in FIG. 6A, includes a frame coupling component comprised of nub mount assembly integrally combined with the motor cover 640. More specifically, the nub mount shell (not shown) to which is coupled the nub mount assembly 610, as previously described herein, is integrally combined with the motor cover 640 during fabrication of the motor casing 640. Motor covers are securely mounted over to motor mounts on mid-electric bicycles, thus allowing the nub mount shell to be manufactured for positioning either below or in front of the motor as mounted on the bicycle. As integrated, the nub mount shell enables the remainder of the steps of engagement of the cargo bicycle conversion system to remain the same as described herein.

A cargo bicycle conversion system of the present disclosure, as depicted in FIG. 6B, includes a frame coupling component comprised of at least one frame connection plate 625, each plate having an inwardly extending male or female adjustment tube disposed thereon 620 for slidable adjustment, as previously described herein. The frame connection plate 625 is attached to the motor casing 640 by way of a plurality of fasteners 680, e.g., bolts through apertures, and disposed between the crank 650 and the motor cover 640. The one or more frame connection plates 625 are generally disc shape having a central aperture therethrough (not shown) to accommodate crank 650 attachment to the motor. The one or more frame connection plates 625 are configured with an member, or arm, extending outwardly therefrom, the arm from which the male or female adjustment tube 620 extends inwardly. The male and female adjustment tube 620 is coupled through the nub mount aperture 335 as previously described herein. Thus, the frame coupling component having a frame connection plate 625 is mounted to the motor casing in an orientation to situate the nub mount 320 below or in front of the motor as mounted on the bicycle for cargo conversion frame 110 engagement. As described, the nub mount assembly 610 enables the remainder of the steps of engagement of the cargo bicycle conversion system to remain the same as previously described herein.

A cargo bicycle conversion system of the present disclosure, as depicted in FIG. 6C, includes a frame coupling component comprised of at least one frame connection plate 625, each plate having an inwardly extending male or female adjustment tube disposed thereon 620 for slidable adjustment as previously described herein. The frame connection plate 625 is configured to be attached to the motor mount 600 by way of a plurality of fasteners 680, e.g., bolts through apertures, such fasteners being same or different fasteners, used to mount the motor to the bicycle. The one or more frame connection plates 625 are generally arcuate shaped, and may be easily modified to match the arc of a specific motor mount. The one or more frame connection plates 625, 626(not shown) further comprise a male and female adjustment tubes 620, 621(not shown) for coupling through the nub mount apertures 335, 338(not shown) as previously described herein. Thus, the motor mount adapter having a frame connection plate 625 is mounted to the motor mount in an orientation to situate the nub mount 320 below or in front of the motor as mounted on the bicycle for cargo conversion frame 110 engagement. As integrated, the nub mount shell enables the remainder of the steps of engagement of the cargo bicycle conversion system to remain the same as previously described herein.

A Preferred Embodiment of a Cargo Bicycle Conversion System

Installation of the instant conversion system begins with obtaining a cargo bicycle conversion system ("Kit"), comprised of: a cargo conversion frame comprising a rear, a middle, and a front section; a frame coupling component comprising a nub mount assembly comprising at least one frame connection plate, at least one nub mount, a thru bolt and optionally a lock ring; a steering adapter system 125 comprising a fork mount, a fork rake adjuster plate, steering linkage, steering arm; a cargo container; and plurality of fastening, coupling, and attachment means corresponding to each of the components of the Kit. Alternatively, each of the components of a kit may be individually obtained and installed on a subject bicycle.

Next, the appropriate subject bicycle is selected for use with the cargo bicycle conversion system of the present invention. The subject bicycle may be a standard bicycle having a non-suspended frame, or lockable suspension frame. The subject bicycle may be a standard bicycle having a standard non-suspended fork or lockable suspension fork. The bottom bracket of the subject bicycle may range in size from 67 mm to 88 mm, preferably, 68 or 73 mm, and be an English Threaded Bottom Bracket. The subject bicycle may further comprise a cable actuated front brake, an about 9 mm or about 15 mm axle front fork, a front wheel that is about 24-29 inches if the subject bicycle is a mountain bicycle style, or about 650c or about 700c if subject bicycle is a road bicycle style. Hydraulic braking mechanisms may be utilized in combination with the present invention, but may further necessitate a deterrent clamp on brake lever. The cargo bicycle conversion system of the present invention attaches at three points on a subject bicycle: bicycle frame, bicycle fork, and the bicycle brake system.

Installation of the Cargo Bicycle Conversion System

To begin installation of the Conversion System, a conversion frame comprised of a, for example, front frame section, a middle frame section, and rear frame section is assembled by coupling the front frame to the middle frame, and coupling the middle frame to the rear frame. The front frame can be comprised of, e.g., an about 2 inch chromoly tube bent at about a 150 mm radius and about 1⅛ inch (about 48 mm) standard head tube mounted, e.g., welded, through and piercing the distal end for receiving a conversion fork, and a about a 48 mm diameter 250 mm tube collinearly mounted (100 mm internal with 150 mm expose), e.g., welded, to the proximal end of the front frame, the collinear extension and/or the front frame having at least one, and preferably a plurality, of corresponding apertures there through (see, e.g., FIG. 1B, indicia 105, 106) for receiving coupling means. The front frame may further comprise at least one, preferably a plurality, of flat mounts permanently or semi-permanently affixed to its top surface for receiving and attaching a cargo container.

The middle frame, comprised of, e.g., an about 2 inch chromoly tube having a distal and proximal end, wherein the distal end of the middle frame having at least one, or preferably a plurality, of apertures there through for receiving coupling means, receives the proximal end of the front frame having a collinear tube which is inserted into the middle frame until the one or a plurality of coupling apertures aligns with the coupling apertures of the front frame, through which fastening means are inserted to secure the front frame to the middle frame. Alternatively, in some embodiments a front frame may be comprised of, e.g., a chromoly tube having a corresponding slightly larger diameter, at least on its proximal end, than the distal end of the middle frame, may be employed. The relative configuration and size of the front frame and middle frame is such that the front frame and middle frame may be integrally combined by sliding the former into the latter, or the latter into the former, aligning the at least one aperture, and securing the positional placement of the front and middle frames via insertion of fastening means, e.g., bolts or the like, through the aligned apertures and securing the fastening means. The middle frame is further comprised of a centrally disposed standard head tube (as described above) in such a position as to receive a steering arm. The middle frame may further comprise one or a plurality, of flat mounts permanently or semi-permanently affixed to its top surface for receiving and attaching a cargo container. The middle frame (and/or the rear frame) may also further comprise a section configured to receive and mount a kickstand or the like. The middle frame may also further comprise of multiple attachment points to allow for adjustment of the size of the cargo container and overall cargo kit frame length. The proximal end of the middle frame comprises a means, e.g., at least one key slot pinch clamp, for receiving and securing distal end of the rear frame. For example, a key slot positioned approximately at the 3-o'clock position and a key slot pinch clamp positioned approximately at the 9-o'clock position on the proximal end of the middle frame provide flexibility for the middle frame to receive the rear frame and be secured, e.g., clamped, to prevent slipping between the two frames (see. FIG. 1B, indicia 107, 108). Key slot clamping mechanisms may also be employed for connecting a front frame and/or middle frame. Aperture alignment and/or key, slot pinch clamp fastening means, e.g., screws, bolts, each provide lateral adjustability of the cargo conversion frame.

The rear frame, having a distal and proximal end, is comprised of, e.g., about 48 mm tube having a nub mount receiver, permanently attached, e.g., welded, to the proximal terminus thereof (see, FIG. 1B, indicia 375). The distal end of the rear frame is inserted into the proximal end of the middle frame, e.g., approximately half-way into the length of the middle frame, with the nub mount receiver vertically oriented such that it is situated on the top of the rear frame allowing the nub mount of the nub mount assembly to be inserted into the receiving cavity, corresponding apertures aligned, and a thru bolt engaged to secure the nub mount assembly to the conversion frame. By adjusting the position of the rear frame within the middle frame, the rear frame may be employed to adjust the overall length of the assembled cargo conversion frame to accommodate different sizes of subject bicycles.

Alternatively, similar adjustments of length to accommodate cargo containers may be accomplished by similar adjustment movement between the front frame and middle frame to align and secure different attachment means apertures.

After the conversion frame is assembled, the cargo container can be rested on the flat mounts aligning apertures m the cargo container based with the flat mounts. Fasteners (e.g., bolts) are inserted into and through each of the cargo container base apertures and corresponding nuts attached at the underside of each flat mount.

Steering Conversion System and Fork Attachment

Moving to the subject bicycle fork point of attachment to the cargo bicycle conversion system, a fork mount assembly comprising a fork mount and a fork rake adjuster plate forms the proximal end of the steering adapter system and is employed to allow for subject bicycle forks with different rake to be utilized with the present Cargo Bicycle Conversion System Fork rake, also known as offset, in this case is the offset of the subject bicycle fork from the steering axis. In order to accommodate multiple subject bicycle configurations and styles, the fork rake adjuster plate has fore and aft adjustment capability, for example, via a 9 mm/15 mm fork mount slidably attached to the fork rake adjuster plate. A typical fork mount has attachments for 9 or 10 mm standard hub forks or may utilize a 15 mm thru axle to secure the fork. In this embodiment of the present invention, a fork mount comprising both a 9 mm and 15 mm fork mount, wherein, the 9 mm mount works with forks using a quick release 9 mm hub or a 10 mm bolt on hub, and the 15 mm side of the fork mount works, for example, for forks that use a 15 mm thru axle hub. In the present invention, preferably, a combination 9 mm/15 mm fork mount is coupled to a fork rake adjuster plate via, e.g., 2 t-slot nuts and bolts, which is mounted to the proximal end of a steering arm. The distal end of the steering arm comprises a steering converter flange that rotatably couples to the proximal end of the steering linkage. The distal end of the steering linkage rotatably couples, e.g., via heim bolt, to a steering tab of the conversion frame fork.

To install the steering system, the front wheel of the subject bicycle is removed. The front end of the subject bicycle is lifted and the fork is mounted and secured to the fork mount component of the steering system. Next, if a split steering linkage is supplied, the first front portion of the steering linkage is coupled to the second rear portion of the linkage via a standard hex bolt. A heim joint is threaded about one-half inch into the end of the front (distal end) of the steering linkage and the process repeated at the rear (proximal end) of the steering linkage with either a heim joint or shoulder bolt. To attach the proximal end of the steering linkage to the steering converter flange, the shoulder bolt is inserted through a bushing, then through the flange, and fastened with a nut. The steering converter flange is now positioned at a 90 degree position in relation to the cargo conversion frame, the cargo conversion fork and wheel are placed in a straight ahead (collinear) position to the subject bicycle, and the heim joint attached to the distal end of the steering linkage is lined up with the aperture in the fork tab. A shoulder bolt is dropped through the heim joint and tab, and then tightened with a nut. Finally, the fork rake adjuster plate is placed into collinear position with the frame of the subject bicycle with the steering arm flange still positioned at 90 degrees, and the upper and lower headsets installed.

To assemble the steering linkage, the proximal and distal ends of the steering linkage are coupled to a steering arm and steering tab, respectively. The distal end of the steering linkage is rotatably coupled to the conversion frame fork by inserting. e.g., an M10 shoulder bolt through an aperture in the heim joint and the steering tab, and torqued to specification using nut. The proximal end of the steering linkage is attached to the steering converter flange, e.g., by inserting an m8 shoulder bolt through an aperture of appropriate size, about 8 mm, in the steering linkage, then an 8 mm bushing, e.g., Teflon, and then through the steering converter flange. To secure the coupling, a nut, e.g., nylon stainless, is installed with a clip, e.g., e-clip, there under.

Bicycle Frame Attachment

A frame coupling adapter comprising a nub mount assembly is installed on the frame of the subject bicycle to create an attachment point for the rear frame of the cargo bicycle conversion system. The nub mount assembly, comprising of at least one frame connection plate with a lateral male adjustment tube, at least one frame connection plate with lateral female adjustment tube, at least one nub mount, at least one fastener, at least one thru bolt, and an optional lock ring, facilitates the precise fitting and adjustment for the use of the conversion system with subject bicycles having bottom bracket shells ranging from about 66 mm to 80 mm in width.

First, the cranks of the subject bicycle are pulled and the bottom bracket removed. The frame connection plate female tube is inserted into the upper aperture of the nub mount from one side. The frame connection plate female tube is inserted into the same aperture from the opposing side. The male and female tubes, thus, engage inside of the nub mount aperture. The nub mount assembly (consisting of the nub mount, two frame connection plates with slidable adjuster tubes, and a fastening means) is installed on the subject bicycle frame either between the bottom bracket shell of the frame and the bottom bracket using the bottom bracket as the fastening means or on the nub mount shell.

To install, the nub mount assembly is held such that the larger holes of the frame connection plates are aligned with the bottom bracket shell or the nub mount shell of the bicycle frame. It is preferable that the at least one nub fastener is facing the front of the bicycle frame. For installation onto the bottom bracket shell, the first side of the bottom bracket is inserted through the upper aperture of the frame connection plate into the bottom bracket shell and threaded from about 50-99%, preferably about 90%, to partially tighten. The corresponding second side of the bottom bracket is inserted through the opposing frame connection plate upper aperture into the bottom bracket shell and tightened and threaded from about 50-99%, preferably about 90%, to partially tighten. The nub mount assembly is held onto the bottom bracket shell, such that the bottom bracket acts as the fastener of the assembly, wherein the lower about half of the frame connection plates and nub are now positioned below the bottom bracket shell of the subject bicycle. Alternatively, the same process of attachment may be employed to attach a nub mount assembly to the nub mount shell of a subject bicycle, and alternative fasteners may be employed rather than the bottom brick.

With the rear frame section inserted into the middle frame section without the fasteners tightened, adjust the overall length of the conversion frame between the fork mount and the nub mount receiver to match the length of the subject bicycle from fork ends to bottom bracket shell. Engage the subject bicycle with the assembled conversion frame by first attaching the fork to the fork mount. Next, insert the nub mount into the nub mount receiver cavity, align the respective apertures, and insert and tighten the thru bolt. Tighten each bottom bracket cup into the bottom bracket shell, utilizing the provided locking if needed. Alternatively, tighten the fastening means, e.g., thru bolt, in the nub mount shell utilizing the provided locking if needed. Next, tighten the at least one fastener on the nub to tighten down the frame connection plate adjustment tubes. The thru bolt is now inserted into the side aperture of the nub mount receiver on the non threaded side and threaded into the threaded side to secure the nub mount to the nub mount receiver.

Proper adjustment of the rear frame in relation to the fork mount facilitates easier engagement between the subject bicycle and container section and more predictable steering. To adjust, the two bolts that attach the fork mount to the adjuster plate are loosened, subject bicycle handlebars turned to identify the center, i.e., mid-range of fore and aft sliding, of the fork mount's movement, at which point the bolts are tightened to lock the rear conversion frame in place.

After the frame is assembled, the cargo container can be rested on the flat mounts aligning the holes in the cargo container with the holes in the flat mounts. Fasteners, e.g., bolts, are inserted into each of the holes of the cargo container and a corresponding nut will be attached at the underside of the flat mount.

Brake Adapter System and Brake Split Holder Attachment

Finally, the braking system is installed. The conversion brake cable and housing run from the disc caliper up, e.g., the fork leg, along the steering linkage, optionally through an aperture in the fork rake adjustment plate, and is secured to the brake split holder. The cable(s) may be removeably secured to the bicycle via cable ties, or the like.

In order to be able to quickly adapt the brake system of either the subject bicycle front wheel or the conversion frame wheel, a brake split adapter holder is employed. A brake split holder allows for the brake cable from the brake lever of the subject bicycle to be connected to and engage either the brake of the conversion frame or the brake of the subject bicycle. Brake split adapters are known in the art and may be employed, e.g., to couple brake cables on a bicycle with tube couplers. However, a brake split holder of the present invention and disclosed herein is removeably mounted to the brake housing of the subject bicycle and positioned such that the cable housing of the subject bicycle runs to a first housing stop on one side of the cable splitter. The brake split holder is fastened to the housing from the subject bicycle immediately prior to it entering the housing stop. Both the conversion frame brake cable and the subject bicycle brake housing can be easily removeably run to the second side of the cable splitter its respective brake caliper. Thus, the brake cable split holder effectively couples the housing from the subject bicycle to either the cargo system brake caliper or the subject bicycle brake caliper.

To install the brake cable split holder, the distal end of the subject bicycle brake lever cable having a male cable splitter mounted thereon is inserted into the first end of the brake cable split holder and secured with a cable tie. Ensure that each of the brake cables connected to either subject bicycle fork or the conversion frame fork have a female cable splitter mounted thereon. To engage the conversion frame fork brake caliper cable, the cable is inserted into the slot aperture of the brake cable split holder and threaded onto the male cable splitter of the subject bicycle lever cable. To switch brakes for disengagement of the cargo bicycle conversion system and engagement of the subject bicycle brake, the conversion frame brake cable is unscrewed from the bicycle brake lever cable, and the subject bicycle brake caliper cable is substituted therefor and screwed onto the subject bicycle brake lever cable.

A Preferred Embodiment of a Cargo Bicycle Conversion System

Installation of the instant conversion system begins with obtaining a cargo bicycle conversion system ("Kit"), comprised of, a cargo conversion frame comprising a rear, a middle, and a front section, a frame coupling component comprising a nub mount assembly comprising at least one motor mount plate; a nub mount shell; a nub mount assembly; and at least one fastening means, e.g., bolt; a steering adapter system comprising a fork mount, a fork rake adjuster plate, steering linkage, steering arm; a cargo container; and plurality of fastening, coupling, and attachment means corresponding to each of the components of the Kit. Alternatively, each of the components of a kit may be individually obtained and installed on a subject bicycle.

Next, the appropriate subject mid-electric motor bicycle is selected for use with the cargo bicycle conversion system of the present invention. The subject bicycle may be a standard bicycle having a non-suspended frame, or lockable suspension frame. The subject bicycle may be a standard bicycle having a standard non-suspended fork or lockable suspension fork. The subject bicycle may further comprise a cable actuated front brake, an about 9 mm or about 15 mm axle front fork, a front wheel that is about 24-29 inches if the subject bicycle is a mountain bicycle style, or about 650c or about 700c if subject bicycle is a road bicycle style. Hydraulic braking mechanisms may be utilized in combination with the present invention, but may further necessitate a different clamp on brake lever. The cargo bicycle conversion system of the present invention attaches at three points on a subject bicycle: mid-electric motor mount or motor casing, bicycle fork, and the bicycle brake system.

Installation of the Cargo Bicycle Conversion System

Installation of the cargo bicycle conversion system onto a mid-electric motor bicycle is substantially similar to that described herein for installation onto a standard bicycle having no mid-electric motor. For ease of understanding and clarity, only the differences are described hereinbelow Bicycle Frame Attachment A frame coupling adapter comprising a nub mount assembly is installed on the frame of the subject bicycle to create an attachment point for the rear frame of the cargo bicycle conversion system. The nub mount assembly facilitates the precise fitting and adjustment for the use of the conversion system with subject bicycles having mid-electric motors. The nub mount assembly is installed on each side of the subject bicycle frame on the mid-electric motor (see. FIGS. 6A-C). To install, the frame connection plates are loosely attached and oriented such that the adjustment tubes are inserted in to the nub mount. The nub mount assembly is coupled to the rear conversion frame receiver by inserting and tightening a thru bolt as previously described herein. The remainder of adjustments, e.g., fork rake and steering adapter, are performed as previously described herein.

Engagement/Disengagement of the Conversion System

In use, the cargo bicycle conversion system of the present invention may be engaged by the following steps: removing the front wheel of the subject bicycle installing the system of the present invention, placing the subject bicycle fork onto the fork mount of the cargo frame steering assembly; coupling the rear conversion frame to the nub mount assembly; securing the fork to the fork mount via a standard quick release skewer or thru bolt; detaching the subject bicycle brake cable; and attaching the brake adapter system of the present invention. Disengagement of the system may be achieved by reversing the above-described steps.

Embodiments of the present disclosure also include a cargo bicycle conversion kit that includes the various components described above, including but not limited to, a cargo conversion frame detachably connected to a subject bicycle, at least one frame coupling component detachably connecting the cargo conversion frame to a portion of the frame of the subject bicycle, and a steering adapter system functionally coupling a fork on the subject bicycle to a fork on the cargo conversion frame. The cargo bicycle conversion kit generally facilitates the reversible conversion of a subject bicycle into a cargo bicycle.

A number of variations and modifications of the disclosure can be used. It would be possible to provide for some features of the disclosure without providing others. The present disclosure, in various aspects, embodiments, and configurations, includes components, methods, processes, systems and/or apparatus substantially as depicted and described herein, including various aspects, embodiments, configurations, subcombinations, and subsets thereof. Those of skill in the art will understand how to make and use the various aspects, aspects, embodiments, and configurations, after understanding the present disclosure. The present disclosure, in various aspects, embodiments, and configurations, includes providing devices and processes in the absence of items not depicted and/or described herein or in various aspects, embodiments, and configurations hereof, including in the absence of such items as may have been used in previous devices or processes, for example, for improving performance, achieving ease and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more, aspects, embodiments, and configurations for the purpose of streamlining the disclosure. The features of the aspects, embodiments, and configurations of the disclosure may be combined in alternate aspects, embodiments, and configurations other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed aspects, embodiments, and configurations. Thus, the following claims are hereby incorporated into this Detailed Description, with each claim standing on its own as a separate preferred embodiment of the disclosure.

Moreover, though the description of the disclosure has included description of one or more aspects, embodiments, or configurations and certain variations and modifications, other variations, combinations, and modifications are within the scope of the disclosure, for example, as may be within the skill and knowledge of those in the art, after understanding the present disclosure. It is intended to obtain rights which include alternative aspects, embodiments, and configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A cargo bicycle conversion system for the reversible conversion of a subject bicycle into a cargo bicycle, where the subject bicycle includes a frame, a rear wheel, a bottom bracket, and a steering mechanism connected to a fork, comprising:
    a cargo conversion frame having a distal terminus configured for engagement with a nub mount receiver and a proximal terminus having at least one fork;
    at least one frame coupling component comprising a nub mount assembly configured to couple the cargo conversion frame to the nub mount receiver to the frame of the subject bicycle detachably connecting the cargo conversion frame to the subject bicycle;
    a steering adapter system comprising a functionally coupled steering assembly and fork coupling assembly functionally and fixedly coupling the fork attached to the subject bicycle to a fork attached to the proximal end of the cargo conversion frame, wherein the steering assembly comprises a functionally coupled steering arm having a steering converter flange and steering linkage, and the fork coupling assembly comprises a functionally coupled fork mount and a fork rake adjuster plate; and
    a brake adapter system comprising a brake split housing adapter configured to functionally and detachably couple a brake lever cable of the subject bicycle to a brake caliper cable attached to the cargo conversion frame.

2. The cargo bicycle conversion system of claim 1, wherein the fork coupling assembly is detachably connected to the fork attached to the subject bicycle.

3. The cargo bicycle conversion system of claim 1, wherein the fork coupling assembly comprises at least one of the following connecting mechanisms for detachably connecting the fork attached to the subject bicycle to the steering convertor: quick release skewers, thru axle skewers, straps, a solid axle with nuts, fork pinching mechanisms, or combinations thereof.

4. The cargo bicycle conversion system of claim 1, wherein the steering linkage has a proximal end and a distal end, the steering linkage distal end functionally coupled to the fork attached to the cargo conversion frame, and wherein movement of the fork attached to the subject bicycle causes corresponding movement of the fork attached to the cargo conversion system through actuation of the steering convertor and the steering linkage.

5. The cargo bicycle conversion system of claim 4, wherein the distal end of the steering linkage is functionally coupled to the fork attached to the cargo conversion frame by at least one of the following mechanisms: nuts, bolts, screws, fasteners, clamps, straps, pins, cotter pins, couplers, plastic clips or joints, lock-and-key mechanisms, thru bolts, quick release skewers, pivot joints, ball-and socket joints, rotational discs, pins, springs, welding, or combinations thereof.

6. The cargo bicycle conversion system of claim 1, wherein the steering linkage is configured to extend from the steering convertor flange to the fork of the cargo conversion frame along a path that is substantially adjacent to the cargo conversion frame.

7. The cargo bicycle conversion system of claim 1, wherein the cargo bicycle conversion system further comprises a front wheel functionally coupled to the fork of the cargo conversion system.

8. The cargo bicycle conversion system of claim 1, wherein the cargo bicycle conversion system further comprises at least one cargo container, the at least one cargo container detachably coupled to the cargo conversion frame.

9. The cargo bicycle conversion system of claim 8, wherein the cargo container is detachably coupled to the cargo conversion frame by at least one of the following mechanisms: nuts, bolts, screws, fasteners, clamps, straps, pins, cotter pins, couplers, plastic clips or joints, lock-and-key mechanisms, thru bolts, quick release skewers, pivot joints, ball-_and -socket joints, rotational discs, springs, hook-and-loop mechanisms, buckles, ties, ropes, welding, or combinations thereof.

10. The cargo bicycle conversion system of claim 8, wherein the cargo container is comprised of grass (bamboo), wood, plastic, paper, metal, metal alloys, polymeric material, carbon fiber, or combinations thereof.

11. The cargo bicycle conversion system of claim 1, wherein the cargo conversion frame is comprised of grass (bamboo), wood, plastic, metal, metal alloys, polymeric material, carbon fiber, or combinations thereof.

12. The cargo bicycle conversion system of claim 1, wherein the at least one frame coupling component detachably connects the cargo conversion frame to the portion of the frame of the subject bicycle by a mechanism comprising at least one securable thru bolt.

13. The cargo bicycle conversion system of claim 1, wherein the cargo conversion frame comprises a substantially linear portion configured to extend a certain distance from an area below the bottom bracket of the subject bicycle to the fork on the cargo conversion frame to accommodate the cargo container.

14. The cargo bicycle conversion system of claim 1, wherein the distal end of the cargo conversion frame is angled upwards to accommodate the fork on the cargo conversion frame.

15. A cargo bicycle conversion kit comprising:
a cargo conversion frame having a nub mount receiver configured to detachably connect to a subject bicycle;
a nub mount assembly capable of detachably connecting the cargo conversion frame to a portion of the frame of the subject bicycle;
a steering adapter system configured to functionally and fixedly couple a fork on the subject bicycle to the at least one fork on the cargo conversion frame; and
a brake adapter system comprising a brake split housing adapter configured to functional and detachably couple a brake lever cable of the subject bicycle to a brake caliper cable attached to the cargo conversion frame;
wherein the cargo bicycle conversion kit facilitates the reversible conversion of the subject bicycle into a cargo bicycle.

16. The cargo bicycle conversion kit of claim 15, further comprising at least one cargo container.

17. A cargo bicycle conversion kit comprising:
a cargo conversion frame having a nub mount receiver capable of detachably connecting to a subject bicycle;
a nub mount assembly capable of detachably connecting the cargo conversion frame to a portion of the frame of a subject bicycle;
a steering adapter system capable of functionally extending a steering mechanism from a handlebar of the subject bicycle to the conversion frame;
a brake adapter system comprising a brake split housing adapter configured to functional and detachably couple a brake lever cable of the subject bicycle to a brake caliper cable attached to the cargo conversion frame;
wherein the cargo bicycle conversion kit facilitates the reversible conversion of the subject bicycle into a cargo bicycle.

18. The cargo bicycle conversion kit of claim 17 further comprising at least one cargo container.

19. A cargo bicycle conversion system for the reversible conversion of a subject bicycle into a cargo bicycle, comprising:
a cargo conversion frame;
at least one frame coupling component detachably connecting the cargo conversion frame to an installed or manufactured nub mount shell;
a steering adapter system functionally coupling a fork attached to the subject bicycle to a fork attached to the cargo conversion frame; and
a brake adapter system comprising a brake split housing adapter configured to functional and detachably couple a brake lever cable of the subject bicycle to a brake caliper cable attached to the cargo conversion frame.

20. The cargo bicycle conversion system of claim 19, further comprising of an adjustable frame length and steering arm length.

21. A cargo bicycle conversion system for the reversible conversion of a subject bicycle into a cargo bicycle, where the subject bicycle includes a frame, a rear wheel, a bottom bracket, and a steering mechanism connected to a fork, comprising:
a cargo conversion frame having a distal terminus configured for engagement with a nub mount receiver and a proximal terminus having at least one fork;
at least one frame coupling component comprising a nub mount assembly configured to couple the cargo conversion frame to the nub mount receiver to the frame of the subject bicycle detachably connecting the cargo conversion frame to the subject bicycle and configured to be adjustable to multiple widths;
a steering adapter system comprising a functionally coupled steering assembly and fork coupling assembly functionally and fixedly coupling the fork attached to the subject bicycle to a fork attached to the proximal end of the cargo conversion frame, wherein the steering assembly comprises a functionally coupled steering arm having a steering converter flange and steering linkage, and the fork coupling assembly comprises a functionally coupled fork mount and a fork rake adjuster plate; and
a brake adapter system comprising a brake split housing adapter configured to functionally and detachably couple a brake lever cable of the subject bicycle to a brake caliper cable attached to the cargo conversion frame.

22. The cargo bicycle conversion system of claim 21, wherein the at least one frame coupling component of a cargo bicycle conversion system comprises a nub mount assembly configured to be adjustable to fit and able to engage with mid-electric motors mounted to the subject bicycle frame.

23. The cargo bicycle conversion system of claim 22, wherein the nub mount assembly is removeably coupled to the mid-electric motor.

24. The cargo bicycle conversion system of claim 21, wherein the at least one frame coupling component of a cargo bicycle conversion system comprises a nub mount assembly permanently affixed or integrally combined with a mid-electric motor of the subject bicycle.

25. The cargo bicycle conversion system of claim 24, wherein the nub mount assembly is permanently affixed or integrally combined via welding, machining, casting, forging, or combinations thereof.

26. The cargo bicycle conversion system of claim 21, wherein the steering adaptor system is comprised of steering linkage configured to allow for length adjustment of the linkage.

* * * * *